US011566872B2

(12) United States Patent
Adrain

(10) Patent No.: US 11,566,872 B2
(45) Date of Patent: Jan. 31, 2023

(54) BULLET PROOF BARRIERS

(71) Applicant: Disruptive Resources, LLC, Westlake, OH (US)

(72) Inventor: John B. Adrain, Spokane, WA (US)

(73) Assignee: Disruptive Resources, LLC, Sheridan, WY (US)

( * ) Notice: Subject to any disclaimer, the term of this patent is extended or adjusted under 35 U.S.C. 154(b) by 0 days.

(21) Appl. No.: 17/863,143

(22) Filed: Jul. 12, 2022

(65) Prior Publication Data

US 2022/0364830 A1    Nov. 17, 2022

Related U.S. Application Data

(63) Continuation of application No. 17/006,424, filed on Aug. 28, 2020, which is a continuation-in-part of
(Continued)

(51) Int. Cl.
*F41H 5/013*     (2006.01)
*F41H 5/24*      (2006.01)
(Continued)

(52) U.S. Cl.
CPC ............... *F41H 5/013* (2013.01); *E06B 9/32* (2013.01); *E06B 9/68* (2013.01); *F41H 5/04* (2013.01);
(Continued)

(58) Field of Classification Search
CPC . F41H 5/26; F41H 5/013; F41H 5/026; F41H 5/0457; F41H 5/0492;
(Continued)

(56) References Cited

U.S. PATENT DOCUMENTS 506,537 A * 10/1893 O'Donnell .............. E06B 9/581
160/276
2,149,481 A    3/1939 Bosch
(Continued)

OTHER PUBLICATIONS

European Standard EN 1523: Windows, doors, shutters and blinds Bullet resistance—Test method. Feb. 1999.
(Continued)

*Primary Examiner* — Joshua E Freeman
(74) *Attorney, Agent, or Firm* — Bodi Law LLC

(57) ABSTRACT

A method of using an anti-ballistic protection system for protecting an interior space in a building. The ballistic barrier includes a laminated material having a plurality of layers of lightweight, flexible, ballistic resistant material such as woven sheets which are secured together into the laminate using a adhesive, heat weld, or stitching. The ballistic barrier is configured to be in a compact retracted state which can be deployed to provide a protective state to protect against kinetic ballistic projectiles. The system may include an automated control system operably configured to change the state of the ballistic barrier from the retracted state to the protective deployed state, such that upon sensing a threatening event or condition triggers a transition from the retracted state to the deployed protective state such that in the protective state. The ballistic barrier in the deployed state is configured to be resistant to penetration by high-speed ballistic projectiles such as a bullet fired from a gun or a shrapnel from a bomb to protect the interior space.

29 Claims, 15 Drawing Sheets

Related U.S. Application Data application No. 16/215,162, filed on Dec. 10, 2018, now Pat. No. 10,801,815, which is a continuation-in-part of application No. 15/050,639, filed on Feb. 23, 2016, now Pat. No. 10,151,566, which is a continuation-in-part of application No. 14/476,206, filed on Sep. 3, 2014, now Pat. No. 10,473,437.

(60) Provisional application No. 62/911,323, filed on Oct. 6, 2019, provisional application No. 62/892,899, filed on Aug. 28, 2019, provisional application No. 62/119,510, filed on Feb. 23, 2015, provisional application No. 61/873,073, filed on Sep. 3, 2013.

(51) Int. Cl.
*F41H 5/04* (2006.01)
*E06B 9/68* (2006.01)
*E06B 9/32* (2006.01)
*F41H 5/26* (2006.01)

(52) U.S. Cl.
CPC ............ *F41H 5/24* (2013.01); *F41H 5/0407* (2013.01); *F41H 5/0471* (2013.01); *F41H 5/26* (2013.01)

(58) Field of Classification Search
CPC .... E06B 2009/6818; E06B 9/264; E06B 9/32; E06B 9/386; E06B 9/40
USPC ........................................................ 89/36.02
See application file for complete search history.

(56) References Cited

U.S. PATENT DOCUMENTS

| | | | |
|---|---|---|---|
| 2,366,514 A | 1/1945 | Gaylor | |
| 2,962,696 A | 11/1960 | Snyder | |
| 3,936,822 A | 2/1976 | Hirschberg | |
| 4,186,648 A * | 2/1980 | Clausen | F41H 5/0435 109/81 |
| 4,588,223 A | 5/1986 | Ledenyi | |
| 5,097,885 A * | 3/1992 | Kitagawa | E06B 9/24 160/84.01 |
| 5,188,161 A | 2/1993 | Erber | |
| 5,370,035 A | 12/1994 | Madden, Jr. | |
| 5,756,922 A * | 5/1998 | Fuller | F41H 5/06 89/36.02 |
| 5,802,783 A | 9/1998 | Bayha | |
| 5,907,929 A | 6/1999 | Poma et al. | |
| 5,915,449 A * | 6/1999 | Schwartz | A47H 23/00 160/349.1 |
| 5,917,775 A | 6/1999 | Salisbury | |
| 5,939,658 A * | 8/1999 | Muller | F41H 5/08 89/36.02 |
| 6,029,558 A * | 2/2000 | Stevens | F41H 5/007 89/36.17 |
| 6,044,889 A | 4/2000 | Liu | |
| 6,125,905 A * | 10/2000 | Woodside | E04F 10/0625 160/67 |
| 6,212,840 B1 | 4/2001 | Davidovitz | |
| 6,296,039 B1 | 10/2001 | Mullet | |
| 6,298,766 B1 | 10/2001 | Mor | |
| 6,338,377 B1 | 1/2002 | Domel | |
| 6,412,391 B1 * | 7/2002 | Stevens | F41H 5/007 89/36.17 |
| 6,494,000 B1 | 12/2002 | Emek | |
| 6,536,174 B2 | 3/2003 | Foster et al. | |
| 6,604,322 B2 | 8/2003 | Horn et al. | |
| 6,607,693 B1 | 8/2003 | Saito et al. | |
| 6,648,048 B2 | 11/2003 | Lai | |
| 6,796,360 B2 | 9/2004 | Ferrie et al. | |
| 6,862,970 B2 | 3/2005 | Aghajanian et al. | |
| 7,036,279 B2 | 5/2006 | Crozzoli | |
| 7,694,482 B2 | 4/2010 | Gazaway et al. | |
| 7,980,166 B1 | 7/2011 | Fuqua | |
| 8,322,268 B1 | 12/2012 | Booher, Sr. | |
| 8,365,803 B2 | 2/2013 | Schoenheit et al. | |
| 9,134,097 B1 | 9/2015 | De Gaglia | |
| 11,125,537 B2 | 9/2021 | Rideb | |
| 2001/0021443 A1 * | 9/2001 | Bornemann | F41H 5/0485 428/196 |
| 2004/0025453 A1 | 2/2004 | Coddens | |
| 2005/0144900 A1 | 7/2005 | Hallissy et al. | |
| 2006/0032160 A1 | 2/2006 | Gazaway et al. | |
| 2006/0151132 A1 * | 7/2006 | Scalfani | E06B 9/08 160/268.1 |
| 2008/0075933 A1 * | 3/2008 | Rovers | F41H 5/0485 112/475.08 |
| 2009/0071604 A1 | 3/2009 | Moeyersons | |
| 2009/0308543 A1 | 12/2009 | Kates | |
| 2010/0043292 A1 * | 2/2010 | Wilkins | F41H 7/035 89/36.01 |
| 2010/0164743 A1 | 7/2010 | Domel et al. | |
| 2011/0239850 A1 * | 10/2011 | Raiser | F41H 5/08 89/917 |
| 2012/0036988 A1 * | 2/2012 | Daniels | F41H 5/06 89/36.02 |
| 2012/0325127 A1 | 12/2012 | Adrain | |
| 2013/0019742 A1 | 1/2013 | Lecarpentier et al. | |
| 2013/0062024 A1 | 3/2013 | Huang | |
| 2013/0146236 A1 | 6/2013 | Chen | |
| 2013/0222130 A1 | 8/2013 | Cooper et al. | |
| 2014/0163751 A1 | 6/2014 | Davis et al. | |
| 2014/0224108 A1 | 8/2014 | Sundberg et al. | |
| 2014/0260937 A1 * | 9/2014 | Whitaker | F41H 5/24 89/36.02 |
| 2015/0000825 A1 | 1/2015 | Crook et al. | |
| 2015/0059990 A1 | 3/2015 | Adrain | |
| 2015/0225996 A1 | 8/2015 | Maksan | |
| 2016/0143486 A1 | 5/2016 | Tsibulevskiy et al. | |

OTHER PUBLICATIONS

European Standard EN 1522: Windows, doors, shutters and blinds Bullet resistance—Requirements and classification. Feb. 1999.
European Standard EN 12216:2002: Shutters, external blinds, internal blinds—Terminology, glossary and definitions. Dec. 1, 2002.
http://blog.modernmechanix.com/venetian-blinds-of-steel/; Modern Mechanix; Venetian Blinds of Steel (Oct. 1937).

* cited by examiner

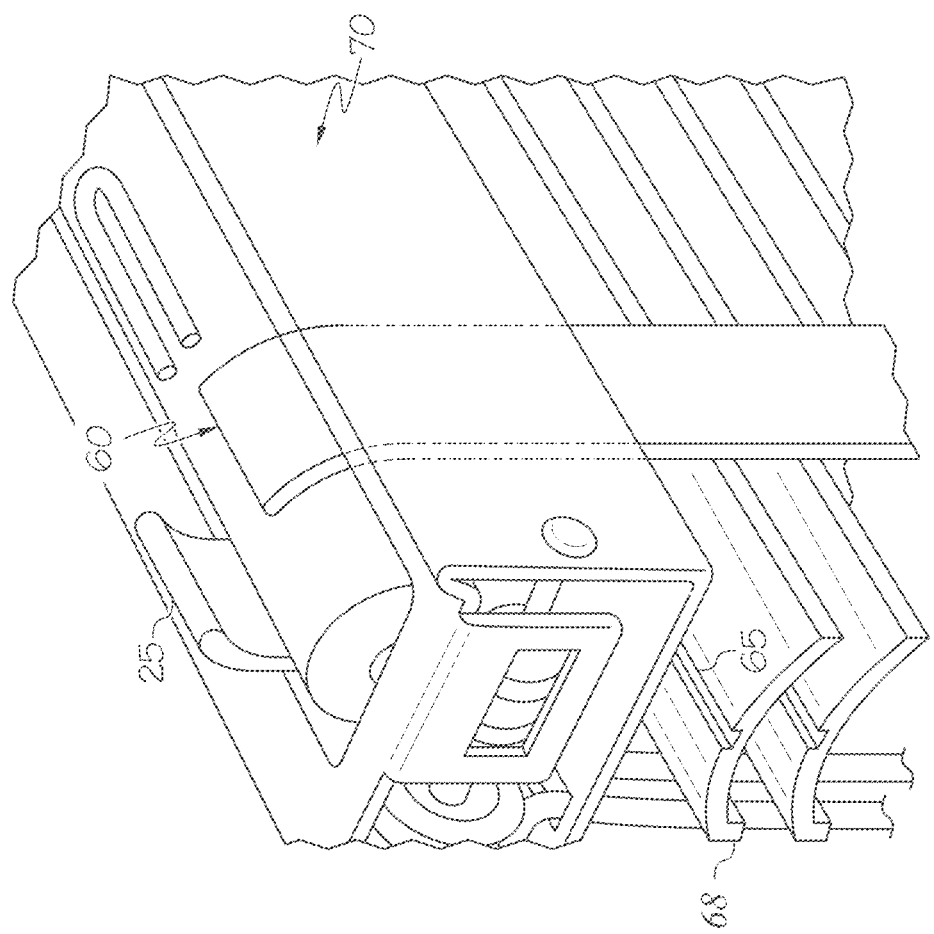

BULLET PROOF BARRIERS

CROSS-REFERENCES TO RELATED APPLICATIONS

This application is a continuation of U.S. patent application Ser. No. 17/006,424 filed on Aug. 28, 2020, which is a continuation-in-part of U.S. patent application Ser. No. 16/215,162, filed on Dec. 10, 2018, which is a continuation-in-part of granted U.S. Pat. No. 10,151,566, filed on Feb. 23, 2016, which is a continuation-in-part of granted U.S. Pat. No. 10,473,437 filed on Sep. 3, 2014, which claims the benefit of U.S. Provisional Application No. 61/873,073, filed on Sep. 3, 2013, all incorporated herein by reference. U.S. Pat. No. 10,151,566 claims the benefit of U.S. Provisional Application No. 62/119,510 filed on Feb. 23, 2015. U.S. patent application Ser. No. 17/006,424 also claims the benefit of U.S. Provisional Application No. 62/892,899 filed on Aug. 28, 2019, and U.S. Provisional Application No. 62/911,323 filed on Oct. 6, 2019, both also incorporated herein by reference.

BACKGROUND

Barriers, such as window blinds, such as venetian blinds, and vertical blinds, screens, shields, etc. may be used in residential and commercial applications as window coverings, screens, barriers, etc. to act as a physical barrier, and because of their ability to selectively vary the amount of light passing through a window, glass door, skylight, or the like, by the varying deployment, or adjustment of a plurality of vanes, louvers or slats.

Current anti-ballistic protection systems in residential and commercial applications such as armored doors, shutters, and windows are usually made of metal or a material containing at least one metal plate, and thus having an extremely high weight. Some plastic systems exist that have lower weight, but that are very flimsy and weak, and thus would provide no protection from projectiles or other forced entry into the dwelling.

It would be useful to utilize the widespread use of various types of barriers to provide unauthorized entry protection to individuals and organizations in residential, commercial, government, federal building and mobile or any suitable application.

SUMMARY

The following presents a simplified summary in order to provide a basic understanding of some example aspects described in the detailed description.

Provided is a barrier comprising material having anti-ballistic properties to prevent penetration by a ballistic projectile, such as a bullet.

In one aspect, a system for protecting a space from ballistic objects using a deployable barrier is provided, comprising: a mounting structure configured for storing the deployable barrier in a retracted position; the deployable barrier comprising a flexible anti-ballistic material formed into a flexible sheet; and a deployment mechanism configured to drop the deployable barrier into a deployed position such that the barrier protects the space from entry by a ballistic object, said barrier being configured to flex and move in response to impact from the ballistic object to absorb energy from the ballistic object to further protect said space from the ballistic object.

In another aspect, a barrier system is disclosed herein including a control system operably configured to cause a change in state of the barrier from an open or retracted state to a protective state; and a sensing system operably configured to detect a threatening event, in which the sensing system upon sensing the threatening event triggers the control system to transition to the protective state.

In still another aspect, the above barrier systems may be configured to secure sides and/or bottoms of the barrier, when deployed, to prevent an individual or large object from entering the space.

In another aspect, a blind system is disclosed herein including a plurality of slats having a ballistic resistant material; a control system operably configured to cause a change in state of the blind from an open state to a protective closed state; and a sensing system operably configured to detect a threatening event, wherein the sensing system upon sensing the threatening event triggers the control system to transition from the open state to the protective state such that in the protective state, the blinds are adapted to be resistant to penetration by high-speed ballistic objects.

In yet another aspect, a blind system is disclosed herein including a blind suspended from a rail and a blind adjustment system that is configured to transition the blinds from an open state to a closed, protective state in which the blinds are adapted to be resistant to penetration by high-speed ballistic objects.

In still another aspect, decorative blinds are provided separate from blinds that provide ballistic protection, with the ballistic blinds being provided in an undeployed state, being deployed when a threatening situation is detected.

In still another aspect, an anti-ballistic window blind system is provided that is configured for providing in the window of a structure having an interior, the system comprising: a valance configured to be mounted at a window; a blind suspended from the valance and configured to be retracted toward the valence to expose the window and deployed from the valence to cover at least a portion of the window, the blind comprising a plurality of slats, wherein each of the slats is comprised of a non-metallic material having anti-ballistic properties, and wherein the slats are configured to be rotatable when the blind is deployed from the valence for allowing light from the window through the blind; and mechanical components associated with the valence for automatically deploying the blind into an anti-ballistic protection mode for protecting the interior of the structure from ballistic objects attempting to enter through the window.

In a further aspect, an anti-ballistic window blind system is provided that is configured for providing in the window of a structure having an interior, the system comprising: a mounting structure; a blind suspended from the mounting structure and configured to be retracted toward the mounting structure to expose the window and deployed from the mounting structure to cover at least a portion of the window, the blind comprising non-metallic material having anti-ballistic properties; mechanical components associated with the mounting structure for automatically deploying the blind into an anti-ballistic protection mode for protecting the interior of the structure from ballistic objects attempting to enter through the window; a sensing system for detecting threat data indicating a ballistic threat exists; and a control system configured to receive the threat data from the sensor, the control system operably configured to trigger the mechanical components to automatically deploy the blind into the anti-ballistic protection mode based on the received threat data.

In still another aspect, anti-ballistic window blind system is provided that is configured for providing in the window of a structure having an interior, the system comprising: a valance configured to be mounted at a window; a blind suspended from the valance and configured to be retracted toward the valence to expose the window and deployed from the valence to cover at least a portion of the window, the blind comprising a plurality of slats, wherein each of the slats is comprised of a non-metallic material having anti-ballistic properties, and wherein the slats are configured to be rotatable when the blind is deployed from the valence for allowing light from the window through the blind; mechanical components associated with the valence for automatically deploying the blind into an anti-ballistic protection mode for protecting the interior of the structure from ballistic objects attempting to enter through the window, wherein the automatically deploying the blind into an anti-ballistic protection mode includes rotating the slats into a closed position if the slats were in an open position, and/or automatically deploying the blind if the blind was in a retracted position; a sensing system for detecting threat data indicating a ballistic threat exists; a control system configured to receive the threat data from the sensor, the control system operably configured to trigger the mechanical components to automatically deploy the blind into the anti-ballistic protection mode based on the received threat data; and a user actuated device configured to trigger the control system to deploy the blind into the anti-ballistic protection mode when actuated.

The blinds provides an anti-entry function, such as a bullet proof system characterized by light weight, high ballistic resistant vanes, louvers or slats for application in a simple, yet unconventional manner.

Also provided is system of protecting a space from ballistic objects using a deployable blind, comprising: a mounting structure configured for storing the deployable blind in a retracted position; the deployable blind comprising an anti-ballistic laminate including a plurality of layers of flexible anti-ballistic material and at least one outer decorative layer with all said layers being secured together into a flexible sheet or slat; and a deployment mechanism configured to drop the blind into a deployed position such that the blind hangs from the mounting structure in a movable manner not secured on a bottom of the blind allowing the blind to flex and move in response to impact from a ballistic object to protect said space from the ballistic object.

Further provided is a system of protecting a space from ballistic objects using a deployable blind, comprising: a mounting structure configured for storing the deployable blind in a retracted position; the deployable blind comprising an anti-ballistic laminate including more than two layers of flexible anti-ballistic material and at least one outer decorative layer with all said layers being secured together into a flexible sheet or slat using stitching; a deployment mechanism configured to drop the blind into a deployed position such that the blind hangs from the mounting structure in a movable manner not secured on a bottom of the blind allowing the blind to flex and move in response to impact from a ballistic object to protect said space from the ballistic object.

Any of the above systems may utilize manual or automated deployment mechanisms to protect a room or space from a ballistic threat.

This summary is not an extensive overview of the features and systems discussed herein. It is not intended to identify key/critical elements or to delineate the scope of such features and systems. Its sole purpose is to present some concepts in a simplified form as a prelude to the more detailed description.

BRIEF DESCRIPTION OF THE DRAWINGS

The features and advantages of the example embodiments described herein will become apparent to those skilled in the art to which this disclosure relates upon reading the following description, with reference to the accompanying drawings, which show some of the example embodiments of the disclosed devices.

FIG. 3 illustrates a detail view of a head box portion an example embodiment blind system;

DETAILED DESCRIPTION OF EXAMPLE EMBODIMENTS

Figure 1:
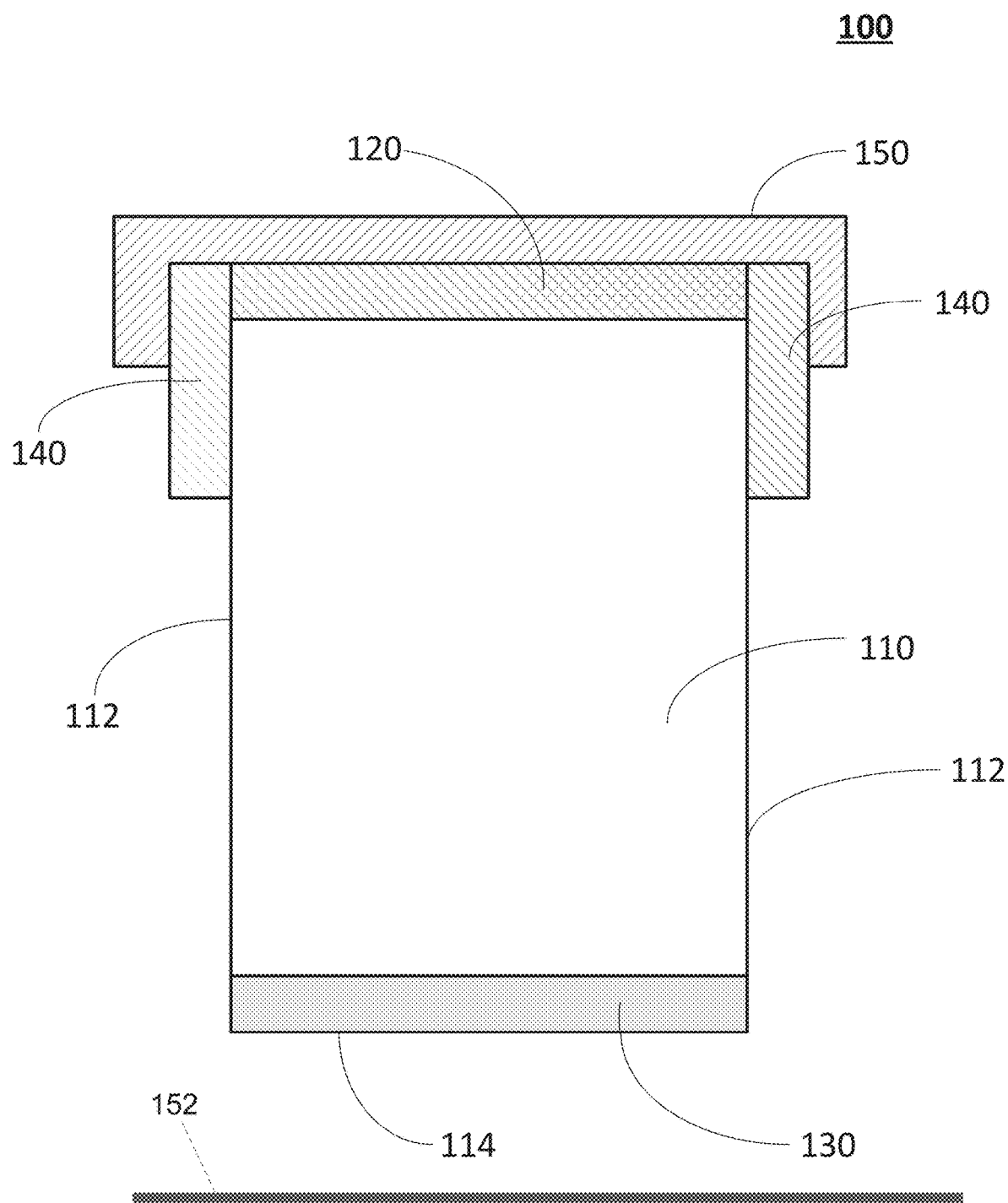
FIG. 1 illustrates an example of a generic barrier.

This application includes modifications and additional alternatives to the bullet proof blinds disclosed in U.S. patent application Ser. No. 14/476,206 filed on Sep. 3, 2014, and U.S. patent application Ser. No. 15/050,639 filed on Feb. 23, 2016, both incorporated herein by reference and substantially reproduced herein below.

This application includes modifications and additional alternatives to the bullet proof blinds disclosed in U.S. patent application Ser. No. 16/215,162, filed on Dec. 10, 2018, and incorporated herein by reference and substantially reproduced herein below.

There are various proposals for improving ballistic protection of individuals and interior spaces in buildings and vehicles as discussed in the related patent applications listed at the top of this application. The inventor has discovered that a problem with many current solutions to these problems is that the protection devices don't absorb much of the energy that is contained in the ballistic projectiles, such as shrapnel or bullets that have been fired. The inventor has determined that one solution to this problem is to allow the protective device, such as a screen, panel, shroud, blind, or other barrier to hang freely, perhaps in a weighted manner, which allows the barrier to flex, vibrate, flow, sway and otherwise move in response to receiving the projectile, thereby dissipating some of the energy from the projectile that otherwise would remain as kinetic energy. This reduces the amount of damage and potential penetration of the projective with respect to a given amount of projection.

As shown in U.S. patent application Ser. No. 16/215,162 and its related parents, all incorporated herein by reference, various deployable barriers using non-metallic anti-ballistic materials can be formed for use as window blinds and similar barriers that might be provided at various locations in buildings. Use in windows, doorways, hallways, and other interior locations as a deployable barrier that is stowed when not needed provides a way to protect various interior spaces within buildings. Furthermore, barriers can be provided within vehicles in either deployable or fixed manners (or both). Deployable barriers might be used to protect vehicle windows, doorways, hatches, and other access points, whereas permanently deployed barriers could be provided within vehicle voids such as in doors, body panels, and other locations.

Of particular interest for at least some embodiments are barriers that are not fixed on their sides and bottoms, but that may include weights to increase their overall mass. Such barriers are free to flex and move in response to receiving a ballistic projectile, thereby converting at least a portion of the kinetic energy of the projectile into kinetic and heat energy in the barrier distributed across the entire surface area of the barrier. Allowing this free motion actually increases the effectiveness of the barrier by reducing the penetration energy of the projectile, thereby effectively improving the ability of the barrier to protect the desired person and/or interior region.

Of additional interest for at least some other embodiments are barriers that are still designed to flex and move in interior portions, but that are fixed on their sides and/or bottoms (i.e., fixed around a perimeter or portion thereof) in order to add additional stability and strength, such as to prevent a person or large object from entering a protected region. Such barriers are still free to flex and move in response to receiving a ballistic projectile in at least portion of their surface area, thereby converting at least a portion of the kinetic energy of the projectile into kinetic and heat energy in the barrier distributed across the entire surface area of the barrier. However, along with a fixed top, the fixed sides and/or bottom prevent individuals or objects from bypassing or pushing aside the barrier to get into the protected region. Hence, only the perimeter, or a portion of the perimeter, is fixed and secured, whereas an interior portion of the barrier is free to flex, vibrate, and otherwise kinetically absorb the energy of a ballistic projectile impinging on the barrier.

FIG. 1 shows a schematic of a basic general barrier design 100 that can be used for many of these various barriers. The primary protective part is a barrier layer 110 which in many of the example embodiments will be comprised of a laminate of a plurality of layers of flexible antiballistic material. FIG. 2 shows an example of such a laminate 400 that can be used, with an inner layer 420 that is also likely to be a laminate, and with optional outer layers 410 and 430 providing protection and/or decorative layers.

The inner layer 420 can be comprised of a plurality of layers of anti-ballistic material that might include layers including one or more of: plastic, composites, wood, metal, fabric, fiberglass or any other suitable anti-ballistic material including, but not limited to, Kevlar® (which is a synthetic fiber of high tensile strength comprised of poly-para-phenylene terephthalamide) or Lexan® (which is a transparent polycarbonate of high impact strength) or Lucite® (which is a solid transparent plastic comprised of polymethyl methacrylate) or DuPont™ Tensylon® (which is an ultrahigh molecular weight polyethylene anti-ballistic material), or a boron treated cloth, or a plexiglass with anti-ballistic properties, for example, or any combination thereof. Anti-ballistic gel materials such as shear thickening fluids that may be transparent can be used to saturate a material or fill voids (some of these materials harden upon impact and might be comprised of non-Newtonian fluids that that thicken in response to force). Other materials or combinations described elsewhere in this document can also be used as an alternative or supplement these materials.

All of the layers provided in the laminate 400 (that may be used as the barrier layer 100 of FIG. 1) can be secured together using any combination of a number of securing approaches, including the use of glue, heat bonding, stitching, quilting, or other means, or any combination thereof, to secure the various layers of the laminate together. Hence, the laminate can be manufactured using stitch bonder or quilting machines, leading to a multi-layered laminate having a plurality of flexible layers and leading to a flexible laminate. Note that each layer might be comprised of thin, solid sheets of any of anti-ballistic material or the material could be woven into a durable and tough and flexible fabric using threads and/or fibers of the material.

An aspect of the first surface that the bullet hits can be designed to act like a strike face, to slowdown and deform/mushroom the bullet before it hits the inside layers which then stop the projectile. For example, the outside layer can be anodized, coated, plated or treated/coated to provide the first task of slowing and deforming the bullet before it hits the layers that do the heavy lifting.

The outside strike face can have ridges or protrusions to roll the bullet. There could also be a ceramic veneer or layer to act as the strike face. The strike face layer can also be a combination of different technologies such as coating a ceramic veneer, such as to keep the weight down.

The whole barrier assembly can be spring loaded or partial break away to dissipate energy, or to move in an X, Y or Z direction. The strike faces could slide in pockets of the barrier. The hinges can be metal or composite based.

A security film can be applied to the strike face to slow down and mushroom the projectile such as a bullet. The material would not be flammable like glass and other methods currently used, would be safer for schools etc. On lightweight metal barriers or blinds (having metal slats) a coating or layer/foam, or lightweight material slides in to the extrusion or stamping.

The barrier shape can be used to change the roll of the bullet, various angles to get bullet on its side, for example. The point of the first, outer layer (other than surface decorative layer(s)) is to act as a strike face and slow down and mushroom flatten out the bullet/projectile. When glass is in front of the barrier, a security film can be applied to a surface of the glass that acts as a strike face to slow down the bullet.

On light weight metal barriers (e.g., shutters or blinds) a coating or layer of lightweight material such as Tensylon that fastens or slides into the extrusion or stamping. The barriers could also be a clear lexan that darkens with sunlight. The barriers or shutters could also be a laminated/sage glass that darkens automatically or when electricity is applied.

Barriers can also be a shutter made of tensylon that has a metal, ceramic or wood veneer surface, to make that barriers more presentable but also act as a strike face. The slats or edges can also have a metal edge to improve the appearance. Lightweight materials light dyneema can act as a ladder or to keep the barriers aligned. A metal shutter can be a extrusion or stamping that the cavity is filled with a combination of materials foam, coating, kevlar polyurethane, or anti-ballistic gel, depending on the function of providing strength, sound dampening, strike face, decorative, etc. The fabric laminate may also be coated with various substances to help provide decorative features, or to stiffen outer layers to deform bullets, or to provide sound deadening, or otherwise provide other desirable features.

The barriers can be provided in modular sections that can deploy horizontally or vertically. The device can deploy from the top bottom or side. Sections can be provided in fabric or hinged, daisey chained, or wired together. Speakers and/or lights can be provided in various sizes.

The sections can be electrostatic or the equivalent of a thin speaker to block light sound bullet etc. (as described in more detail below). The barriers can provide light or emitted sound. Barriers, such as blinds or shutters can use speakers for security, and can block light and provide sound. Speakers can be provided to vibrate the barriers do active noise cancellation.

Barriers can be designed in a way to dissipate the energy from the shot through motion, destruction, heat dissipation, deformation, or other processes. They may sacrifice themselves much like a formula one car sacrifices itself to save the driver.

A cavity or pockets of the barriers (e.g., blinds or shutters) can be provided to house different modules according to the needs desired or a combination of elements. Slats could rotate on there axis to displace energy or change side according to purpose.

The barriers can be comprised of various layers of fabric material. The material layers may be secured to each other by stitching, quilting, gluing, welding, or merely the edges may be bound and perhaps tacked in a few spots leaving inner layers unsecured to each other, allowing motion or pockets for other uses, such as inserting materials or gels. Perhaps not stitch bonding or perhaps a very open quilt pattern.

A logo can be provided, such as using 1 inch or ¾ inch binding, or by sewing in a logo. As many as 18 plies or more of woven Kevlar fabric or other material can be used in the laminated material. Depending on the weave and year size, the result can meet at least a level IIIa protection, or more. Fabric style can be 600d Kevlar KM2 Plus, 24×24 square yarns per inch, plain weave construction, Polyester stitching yarn, 75 denier textured yarn. Stitch pattern can be: linear chain stitch (machine direction), 3.5 gage spacing. Quilting can be used to secure the layers to each other. Layers secured only at the ends can also be utilized. It is noted that the very looseness, flexibility, and motion of the material aids in energy absorption, providing better ballistic protection and penetration avoidance.

Referring back to FIG. 1, the barrier layer 110 will be fixed at one or more ends using either or both top mounting structure 120 and side mounting structures 140 to securely connect to the structure 150 of the building or vehicle. These structures will securely fix one end of the barrier layer 110 to a secure structure, such as a window or door frame, a ceiling, or vehicle panel or frame. Note that where the barrier is of a deployable embodiment, the top mounting structure 120 may include features that retract and/or store the barrier layer 110, such as disclosed in a number of the parent applications in embodiments such as deployable window blinds.

In this generic approach, as discussed above, the barrier layer 110 will be a flexible layer that can move, vibrate, swing, and otherwise convert the kinetic energy of the ballistic projectile into kinetic and/or heat energy in the barrier 100 by nature of having barrier sides 112 and a barrier bottom 114 that are not secured to any structure in this free hanging embodiment. A weighted end 130 can be provided on the barrier layer 110 to add mass to the barrier so that the kinetic energy of the projective is also transferred to this mass as kinetic energy by moving the mass of the end 130, which can include lifting the end, swinging the end, and other types of motion. The end 130 also helps keep the barrier 100 in place by providing stability and in a deployable embodiment, may also help deploy the barrier 100 in emergency situations, as is also discussed in the parent applications.

As an alternative, the side mounting structures 140 may be extended further, even along the entire length of the barrier sides 112, to secure the sides. Furthermore, an optional floor structure 152 can be provided at a bottom of the barrier 100, such as on or beneath a floor, to secure the barrier bottom 114 when deployed. For example, bottom 114 may include a magnet along it's length as part of the weight 130, and the floor structure 152 could include a magnet of an opposite pole (which may be an electromagnet), to secure the bottom 114 to the floor. Alternatively, floor structure 152 might include a latch or gripping device that secures the bottom 114 to the floor. Hence, in conjunction, extended side mounting structures 140 and/or the floor structure 152 secures the barrier 100, when deployed, to prevent individuals or objects from passing beyond the barrier 100 into a protected region.

Note that automatic deployment, based on the detection of a dangerous situation such as an explosion or gunshot (e.g., triggered by sound waves, breaking glass, light flash, or even detection of intruders, for example) can be provided as discussed in the parent applications. Manual deployment through activation of a motor or drop function through use of a switch, lever, or other manual activator can also be provided as an alternative or supplemental means of deployment. The weight 130, when provided, can aid in quick deployment. Such barriers can be provided in windows, doorways, hallways, or even across rooms, for example.

Alternative approaches where the barrier is installed in a rising manner could also be provided. For example, posts may rise out of the ground or floor for deploying the barrier from the ground up, with the top portions free to move, or with sufficient flex in the barrier to allow freedom of motion. Such devices can protect hallways, stages, rooms, doorways, garage doors, or other locations in and out of buildings.

Figure 6:
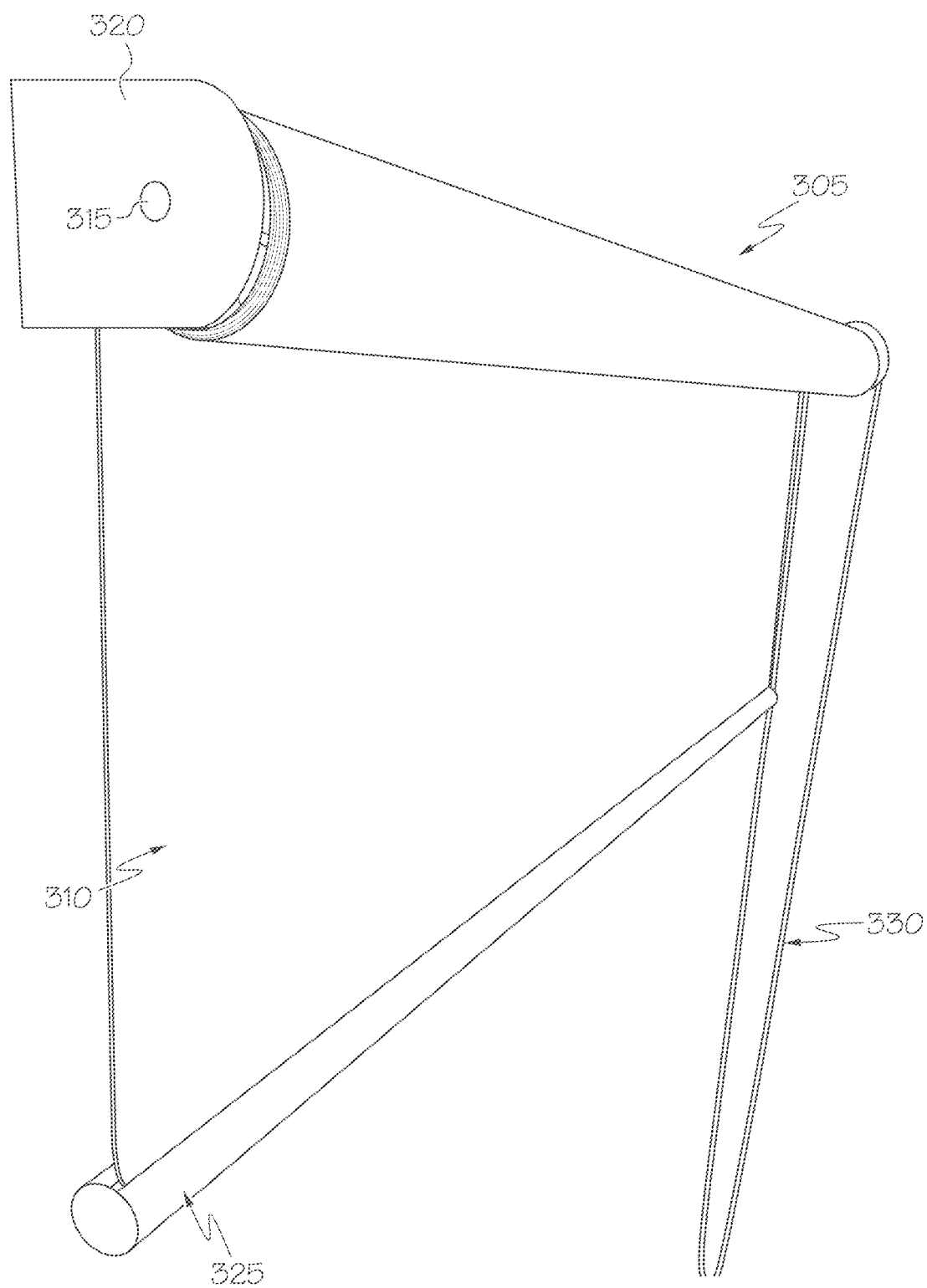
FIG. 6 illustrates an alternative example embodiment of a perspective view of the blind system.

FIG. 6 shows a particular embodiment of a generic approach by providing a blind 305 with support and stowing structures 320, 315 for deploying the barrier layer 310 with weight 325 in a window or door frame.

Figure 2B:
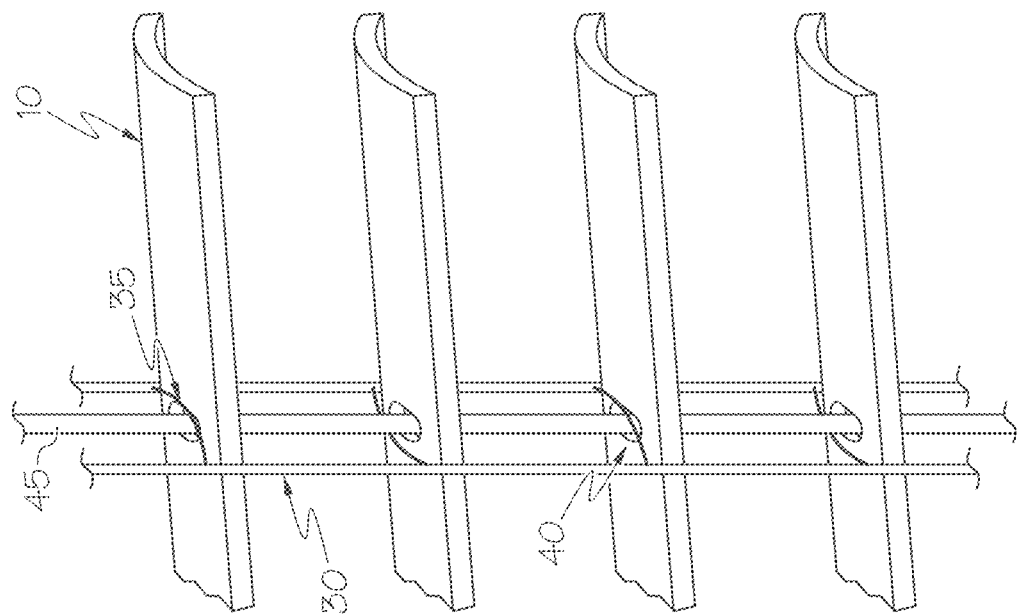
FIG. 2B illustrates a detailed perspective view of an example embodiment of the blind system.
Figure 2A:
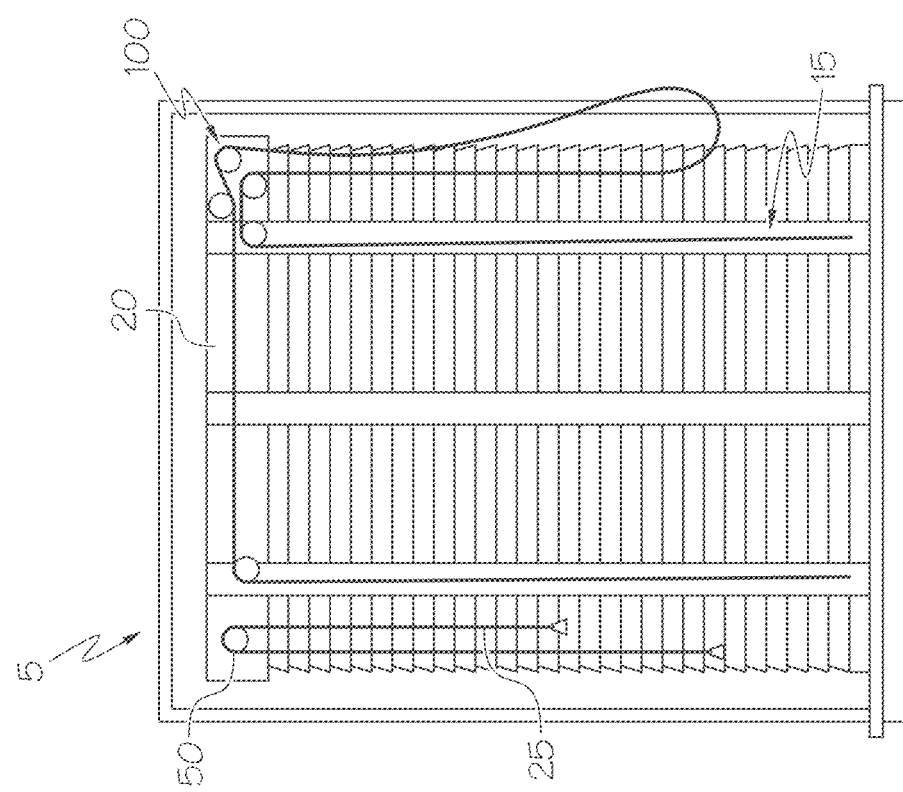
FIG. 2A illustrates a front view of one example embodiment of a venetian blind system having horizontal slats.

Referring to FIG. 2A, an example embodiment of a barrier system, such as a window blind system, is shown. The blind system 5 includes a plurality of members such as slats, (also called louvers or vanes) 10 resting or hanging on the rungs of one or more ladders 15, which are movably suspended from a head, bottom or side rail 20, which may be mounted to a window or door frame. The slats 10 could be of horizontal or vertical orientation.

The slats could be formed having matching grooves or a tongue and groove system to allow the slats to interlock or overlap with each other in a more secure way to ensure better resistance to ballistic intrusion, as described elsewhere herein. For example, the slats might overlap by ½ inch.

The slats 10 can be of conventional construction but with updated materials, and can be constructed of a number of different materials having desirable properties, including, but not limited to, the following materials: plastic, composites, wood, metal, fabric, fiberglass or any other suitable anti-ballistic material including, but not limited to, Kevlar® (which is a synthetic fiber of high tensile strength comprised of poly-para-phenylene terephthalamide) or Lexan® (which is a transparent polycarbonate of high impact strength) or Lucite® (which is a solid transparent plastic comprised of polymethyl methacrylate) or DuPont™ Tensylon® (which is an ultrahigh molecular weight polyethylene anti-ballistic material), or a plexiglass with anti-ballistic properties, for example, or any combination thereof. Other materials or combinations described elsewhere in this document can also be used as an alternative or supplement these materials.

In an example embodiment, the slats could be provided as a laminate, such as steel or aluminum with a carbon fiber or tensylon or fiber glass backing. Decorative layers or paints can be provided for room esthetics. Also, fabric can be treated with boron to form a ballistic resistant material. For example, a fabric can be dipped into a boron solution, then heated in an oven at more than 1000° C., which changes cotton fibers in the fabric into carbon fibers, such that the carbon fibers react with the boron solution to produce boron carbide.

The slats 10 could vary in shape, width, thickness, and/or orientation to form blinds of various styles and construction, as desired. The slats 10 can be made flat or curved across their transverse dimension, they can be of any desired width or length or thickness, and they could be provided of different dimensions, such as, for example one, two, three, or four inches wide or any other suitable width for the desired application. Rather than horizontal slats, the slats may be arranged vertically, as shown elsewhere in this document. The lengths of the slats for the various blind designs can be varied according to the window or door size that they are being utilized to protect, and they could be of a length of a foot or more, up to 4 to 8 feet or more, as desired.

Figure 2C:
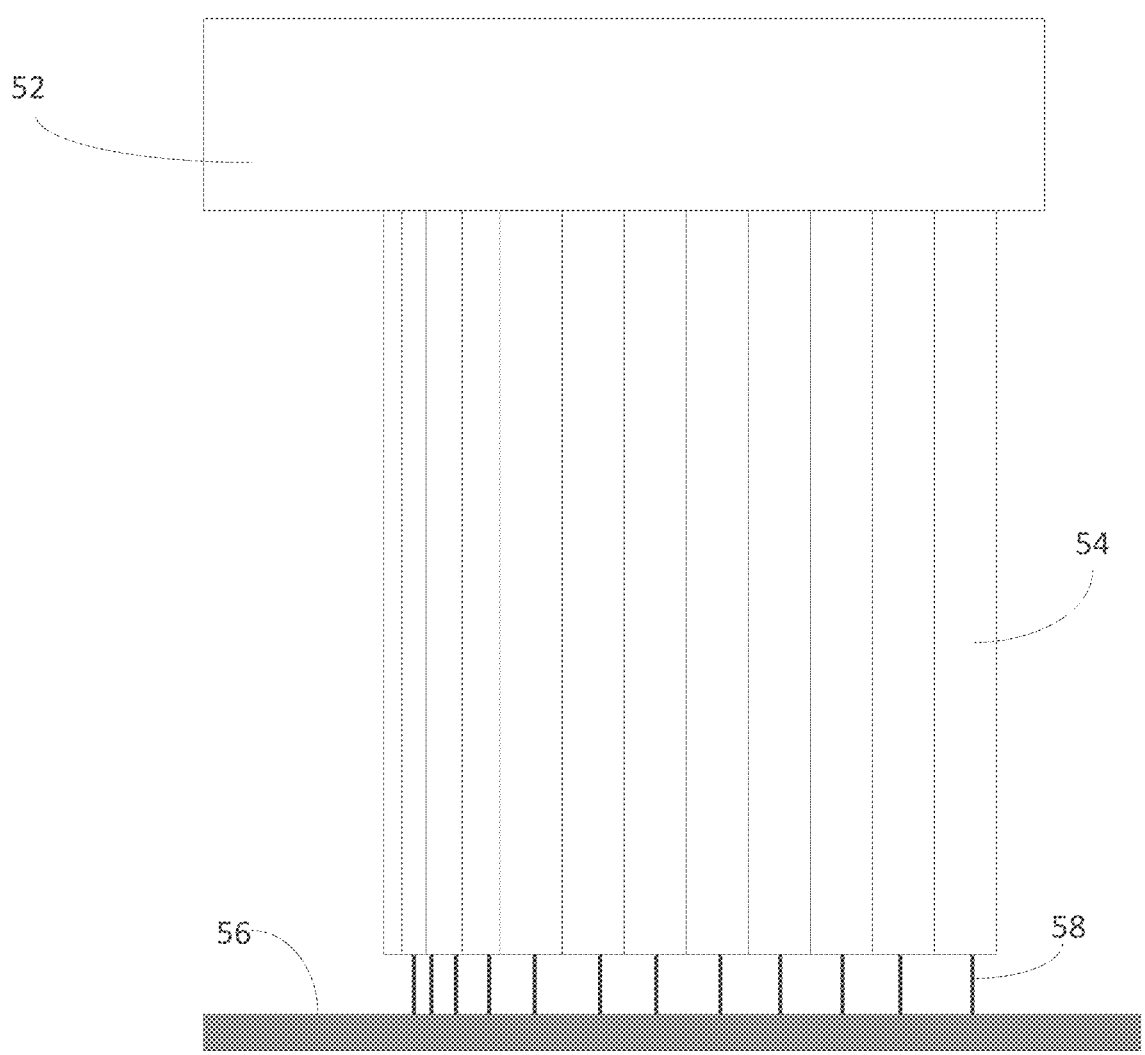
FIG. 2C illustrates a front view of another example embodiment of a venetian blind system having vertical slats.

FIG. 2C, shows an arrangement of vertical blinds having a valance 52 and vertical slats 54, shown with the slats partially retracted. For vertical blinds, a rail 56 can be provided at the base of the blinds to provide further structural strength to the slats via connector 58, which comprise a tab or other structure that is inserted into a slot in the rail 56 to avoid deformation of the slats 54 during a protective function.

Turning to the operation of the blind system 5, the slats 10 can be tilted (e.g. by rotation) by a tilt mechanism 50 to let in partial light, such as when a tilt wand or cord 25 is used to adjust the slats 10. The slats 10 can also be lifted or collapsed by a lift mechanism 100 (for example, to fold or accordion the slats into a compact position) to let in full or nearly full light, for example.

Referring to the example embodiment of FIG. 2B, the slats 10 are suspended by the ladder 15 which is comprised of at least two strips of cloth or string or tape 30 that allows the slats 10 to be suspended in a manner such that all slats 10 in unison can be rotated nearly 180 degrees, such as to go from an open condition (state) to a closed (protective) condition (state). The tape 30 can be made of any flexible material such as fabric, plastic, nylon, polyester, or any flexible material or the like. The ladder 15 further comprises a connector tape 35 which connect the two strips of tape 30 together. Rotating the tilt-cord 25 causes the slats 10 to rotate/tilt a longitudinal axis in order to open or close visual access to the outside from inside the room in which the blinds are installed.

As an alternative to rotation, in some embodiments the slats may be opened and closed by sliding the slats or collapsing the slats together, for example. And the entire blind may be retracted toward the top (valence) structure or deployed as desired.

The slats 10 of the blind system 5 further comprise rods 45 routed through rod holes 40. In this example embodiment, each slat 10 comprises at least one rod hole 40. At least one steel rod 45 which is affixed to the head or bottom rail 20 runs through each slat 10. The slats 10 could pivot about the steel rod 45 which is encased in the slats 10. Pulling the lift-cord activates the lift mechanism 100 causing either the bottom rail or the top rail to rise, sequentially collecting the slats from the bottom up or the top down and compressing the entire array of slats 10 against the top-rail.

Turning to FIG. 3, the blind system 5 may include a rotator member, or tube 60 provided for rotation of the rotator 60 within an axis provided in the head box valance 70. The tilt cord 25 is fixedly attached to the rotator 60 and hangs downwardly from the head box.

Figure 9:
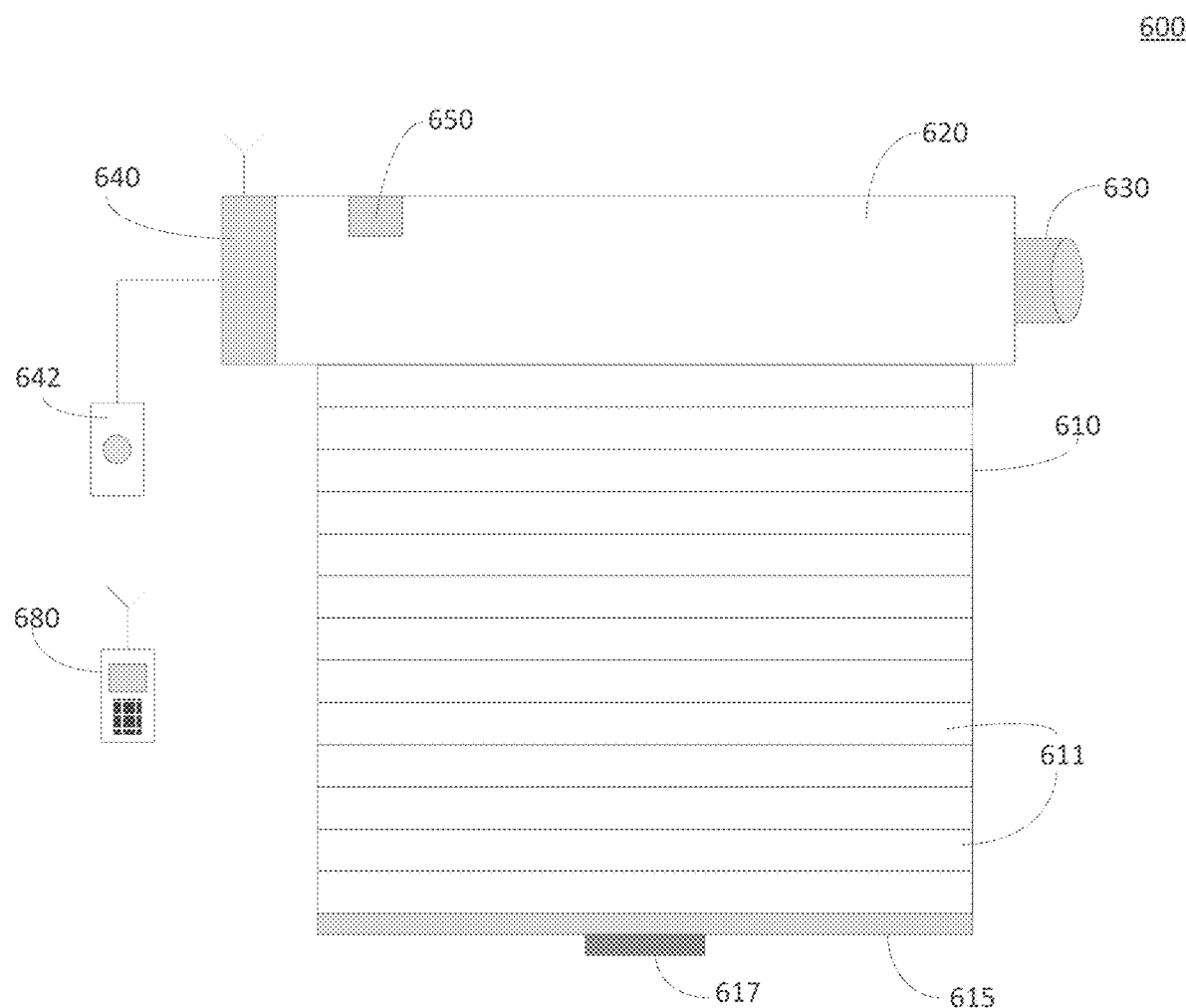
FIG. 9 illustrates another example embodiment of a blind system adapted for automatic deployment with remote control.
Figure 9A:
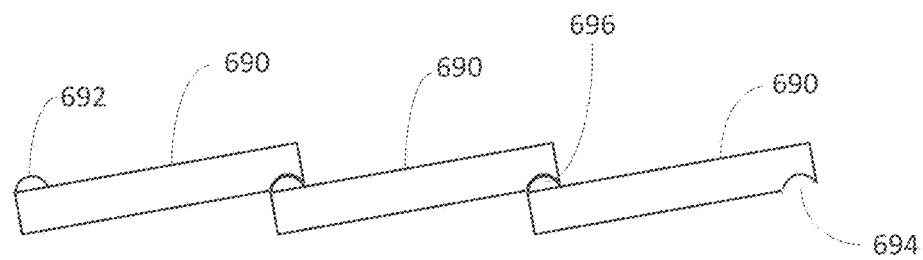
FIG. 9A illustrates an example of interlocking slats for use in various blind systems.

In an example embodiment, the slats 10 may have a groove 65 and and/or tongue 68 that may run the length of the slats 10 to interlock the slats together during deployment. While the embodiment shows the groove runs the length of the slat, it is appreciated that a groove-tongue system located at the edge of the slat 10 may suffice. The groove 65 and tongue 68 allows slats 10 to interlock when they are in a closed position for additional strength. In another example embodiment, the slats 10 can have fasteners that allow them interlock for additional strength. The fasteners could engage with the window or door sill for added strength, if desired. Or magnets or electromagnets might be used to interlock the individual slats together. Another example of such a tongue-and-groove interlocking approach is shown in FIG. 9A, described below.

Figure 4:
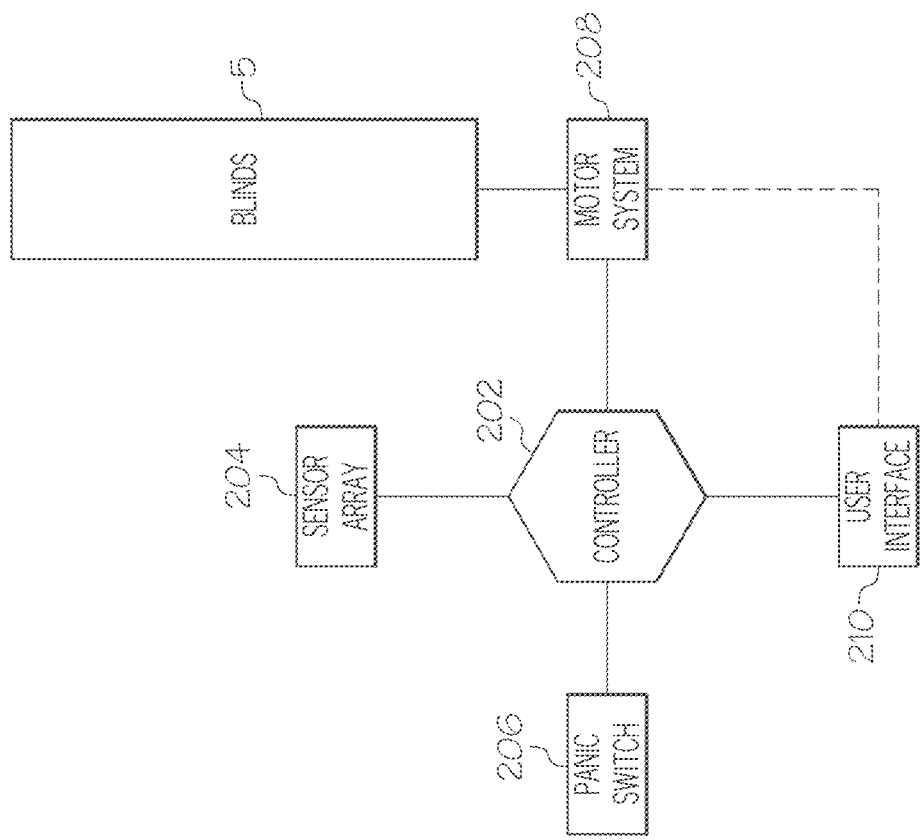
FIG. 4 illustrates an example control method for the blind system.

FIG. 4. Illustrates an example of a control system which may be used by any of the embodiments described herein to control the blind system 5. The control system can include a controller 202 with one or more sensors that form a sensor array 204 connected to the controller 202, and a panic switch 206 connected to the controller 202. The sensors may be pre-existing sensors in a home defense system or conventional after-market sensors capable of detecting ballistic signals such as sound (e.g., gun shots or breaking glass), gun powder, gun impact, muzzle flash, temperature, and the like. The sensors could be any of those typically used to detect a break in, for example. The controller 202 is connected to a user interface 210 whereby a user may activate and apply settings to the blind system. The controller 202 is also connected to a motor system 208 for actuating the blind system upon receiving information indicating that a threat is present and that the blinds should be closed (i.e., put into a protective state such as a ballistic protection mode).

Where a building may already have a central control system (e.g., a security or other alarm system), controller 202 may utilize such a system by adding additional customized code for operating the blinds system 5. In another example, the blinds could also utilize ground sourced radar, infrared (heat), sonar, or some other active or passive detection system. The sensor array 204 can include one or more heat sensors, infrared sensors, video sensors, audio sensors, smoke detectors, or other types of sensors, or may utilize already existing sensors of a fire or burglar system, for example. Any of the sensors in the sensor array 204, the panic switch 206 or the user interface 210, or any combination of these components, may be connected to the controller 202 in a wireless manner, such as by WiFi or Bluetooth, for example, and the panic switch and/or user interface could be implemented on a cell phone or tablet computer, for example.

The system or any of its components may be controlled by any external or internal system, such as one that may exist prior to the installation of the blinds. For example, the blind system could be tied to an external system such as an alarm system or video cameras with analytics. The blind system could also be controlled remotely via the internet or a WiFi or Bluetooth connection by any connected device such as a tablet, computer, PDA, or a smartphone. Blinds such as disclosed herein would be very useful in a panic situation in a school or federal building. Such blinds could also be used in a lock down situation to prevent people or valuables from leaving the premises, for example. FIG. 9, described below, shows an example embodiment of a remotely controllable system.

The blinds could be retrofitted to an existing building or other structure, and adapted to tap into existing security or burglar alarm systems, for example, or they could be added during structure construction.

The blinds could also be adapted to sense the location of the occupants of the building and close by according to predetermined parameters such as direction of threat and the location inside the building that would be the best to return fire from. Blinds could also be controlled by facial recognition, video analytics, or by the occupants' voice or any other suitable biometrics, such as for recognizing an threatening person, such as an ex-spouse, or ex-employee who has made threats or acted in a threatening manner, or otherwise recognizing a wanted criminal or an enemy soldier, for example. When the blind system 5 is activated, the slats 10 may be configured to overlap each other to form the interlocking pattern discussed above so as deflect bullets, shells, or other ballistic weapons to prevent a fatal impact and/or property damage. Such blinds can protect from thrown objects as well, such as rocks, grenades, bricks, molotov cocktails, etc. Blinds could be controlled individually or together with a timing mechanism.

The blinds could be configured to protect against remote monitoring of sound and conversation, such as by providing random vibrations to the blind to avoid vibration detection by remote monitoring devices, for example.

As an example use, the blind system may be provided in an open state where the blinds are provided in an open condition (e.g., with open slats) to allow viewing through the blinds, or the blinds in a retracted position. The blind system sensor array would detect a potential intruder or the sound of gunfire using visual, auditory, or other sensed information. The system would then automatically enter a protective state, such as by closing the blinds (e.g., closing the slats) or deploying the blind (by lowering it to cover the window), or both, to protect the interior of the room from external entry of projectiles (e.g., bullets), for example. Or the system may detect the entry of a ballistic projectile (e.g., a bullet, rock, etc.), or threatening shouts or yells, sirens, explosions, proximity of threatening individuals, etc., in which case the blinds would be activated into a protective mode.

Figure 5:
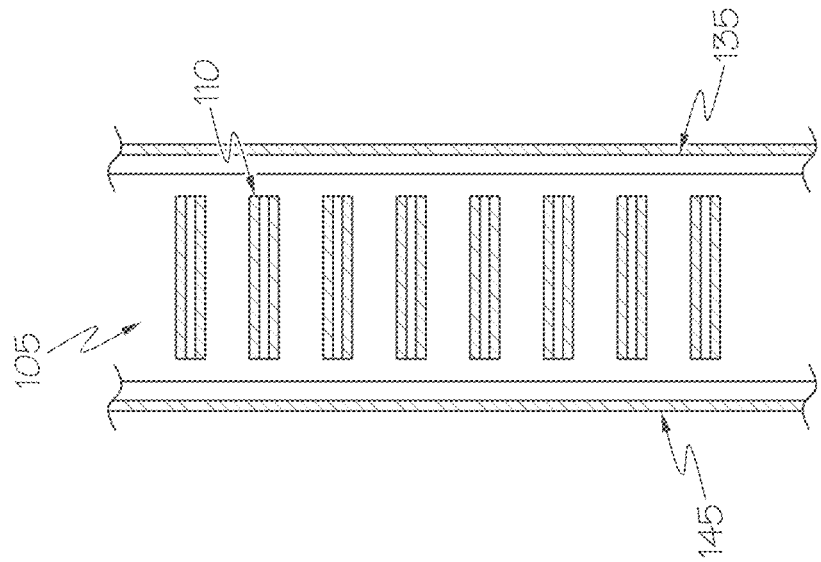
FIG. 5 illustrates an alternative example embodiment of a side view of the blind system.

In an alternate example embodiment illustrated in FIG. 5, the blind system 105 can reside between two glass panes, such as safety glass panes 135 for use in applications like automobiles, airplanes, boats or other mobile applications. The blind system 135 may also be used in stationary applications like residential and commercial applications. The safety glass panes can be made of any lightweight glass material which is useful in an armored car to reduce weight of the glass used which improves the fuel efficiency of the vehicle.

In an example embodiment, the slats 110 used between the safety glass panes 135 could be comprised of a composite or laminate, such as fabric with a carbon fiber or tensylon or fiber glass backing or other ballistic resilient backing.

In an example embodiment, the glass panes 135 could have a layer of safety film 140 such as, for example, Cellulose acetate film, 3M safety film, Armor guard films or the like for additional protection. The safety film can be between 4 mil to 10 mil, for example, although other thicknesses could be used. In another example embodiment, the glass panes 135 could be made of fire glass with a gel center such as manufactured by SAFTI First, for example.

In an automobile application, the blind system 105 could be controlled with safety in mind so that a driver does not lose all drivability at once and improving the ability to evade. For example, the blinds could have a small port hole for the driver of the vehicle to see out of to allow the driver to continue to drive toward a safer area, for example. Or the blinds could be comprised of a transparent material with anti-ballistic properties, or a material with anti-ballistic materials woven therein.

In use for mobile applications, such as in boats, or airplanes or automobile, the blind system 105 could be configured to tilt or close the blinds based on temperature, sound, threat, geographic terrain, environmental conditions and any outer suitable factors. For example, as a vehicle goes up a hill, the blinds can be adapted to tilt so that air or light can get in and not bullets.

The blind system 105 could also be fire rated to prevent fire from spreading to the next room or structure through the use of fire retardant or preventive materials, where the blinds can be automatically closed when a fire is detected through monitoring of temperature, light, or infrared, for example.

In another example embodiment illustrated in FIG. 6, the blind system 305 may have a roll up blind (e.g., window shade) configuration that may utilize an anti-ballistic fabric material 310, for example, and that can be used as protective covering to protect equipment such as, for example, a radiator, or a ventilation system, or on an intake area of a jet engine, engine, window, radiator, or gas tank of an automobile (or other vehicle), or any other suitable protective covering applications. The roll-up blind system 305 may be made of bullet resistant fabric such as Kevlar or Lexan or DuPont™ Tensylon®. Other materials described herein could also be used, as an alternative or to supplement these materials. In such a system, the blind may be comprised of a contiguous sheet of material, or patches of such material, rather than slats.

Figure 8:
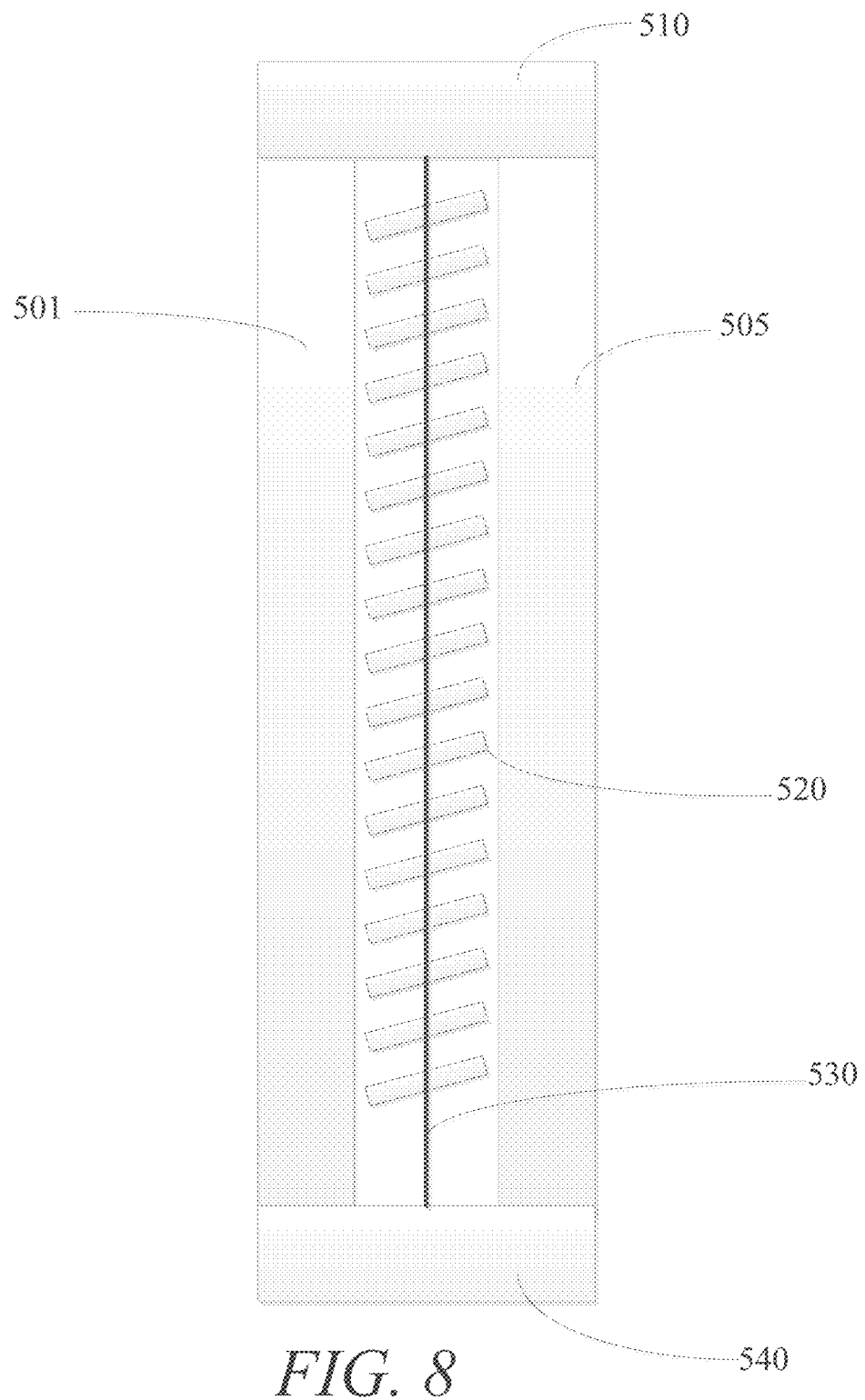
FIG. 8 illustrates another example embodiment of a blind system having blinds provided between panes of glass.

In an alternate example embodiment to the slat blind system, the roll up blind system 305 can reside between two glass panes, such as safety glass panes 135 for use in applications like automobiles, airplanes, boats or other mobile applications, as shown in FIG. 5 or FIG. 8. Such a system might utilize a Kevlar curtain that falls between windows panes, or even in front or behind a single pane.

Any of the protective blinds described herein might also be stored in a ceiling rather than a valance structure, and in some cases bullet proof panels rather than blinds might be used, where deployment in emergency situations means that the blinds drop from the ceiling to provide ballistic protection.

The fabric blind 310 could also tilt or otherwise be operated according to the threat or terrain. The fabric blind 310 could close from the top or bottom depending on the design of the building or application. The fabric blind 310 could also run left to right, for example. The blinds could also tilt according to the threat or terrain. For example with vehicle application when the blind is used as a radiator cover, as the vehicle goes up a hill the radiator blinds tilt so air can get in and not bullets.

In an alternate example embodiment, the roll up blind system 305 may be used for windows, doors, entryways, or any other desired application in a building or vehicle. The roll up blind system 305 could suspend from a rail 315 and that may be disposed within a head box 320 (acting in concert at a valence) and may be weighed down by bottom rail 325 to maintain its position and add structural strength. The weight of the bottom rail can vary to match the desired application, or it may be paired with a structure enhancement such as through the use of electromagnets or a structure secured to a sill or floor. A reel cord 330 may be used to be roll up the blinds 310 or to roll down the blind 310. The reel cord 330 may also be pneumatically or automatically driven, such as by using a chain. The lengths of the blind 310 can be varied according to the window or door size that they are being utilized to protect, and they could be of a length for the desired application.

Generally, any of the blind systems provided herein will typically be provided with blinds that can be placed in an open state at the request of a user to enable viewing through the blinds, and/or to allow for airflow and/or light flow and/or other flow through the blinds. Such blinds can also be closed at the request of a user, in which case the blinds may also be in a protective state. The blinds can also be provided in an intermediate state, able to both provide some limited ballistic protection and to let in a substantial amount of light. Upon detection of a threatening condition, such as detection of a gunshot or a flying projectile, or by activation of a panic button or security system, blinds that are in an open state will be transitioned into a closed, protective state to protect against ballistic projectiles or other threatening materials.

In addition to the embodiments disclosed in the '206 application and described above, various forms of vertical blinds based on concepts provided in that application are also provided. Additional materials are also disclosed for constructing the blinds in this and that application.

The use of a Kevlar fabric having expanding baffles between the layers is one alternative in such blinds. By providing baffles in the material, the material is enabled to expand in an outward direction, which will help to absorb some of the energy provided by a ballistic impact.

The fabric blinds could utilize horizontal or vertical pleats or slats. Separate vanes or material can be provided to add bullet proof functionality, such that existing blind designs, that may have ornamental aspects, can be supported by a set of bullet proof blinds placed underneath the current blind design. The blinds would act in conjunction to open and close in a traditional manner, with the added functionality of providing ballistic projectile protection. Solenoids or motors, or electromagnets, or other electrical or mechanical devices can be used to mechanically open and close the blinds.

In some options, a bullet proof blind (that may be provided behind or in front of a traditional blind or a as a full replacement) may remain normally in a retracted or otherwise open mode. The bullet proof portion of the blind may be hidden in a valence of the blinds, for example, or be rotated or retracted in an open position. The bullet proof material can be automatically deployed, such that upon a triggering event (such as the detection of a gunshot, or the triggering of a proximity alarm or other type of burglar alarm, for example) the bullet proof (ballistic) blind would then deploy, such as by dropping into place from a valance or roof or ceiling, for example.

Such a dropping ballistic blind might be comprised of panels or slats of ballistic material that are folded, overlapped, or otherwise collapsed in the retracted position, or it may comprise a roll of ballistic fabric that rolls to retract, and unrolls to deploy to form a ballistic layer of protection. A weight may be provided at the bottom of the roll to aid deployment (e.g., unrolling) and to help keep the material in place for stopping or slowing the projectiles. Alternatively, some structure to increase the strength of the deployed blind could be used, such as electromagnets or electrical or mechanical latches at the base to secure the deployed blind to the floor or window sill or wall or other structure.

The blinds can be placed between layers of glass, for example, which can be used in original installations or to retrofit existing windows. The blinds may be used in conjunction with bullet proof or bullet resistant glass. For example, blinds such as disclosed in U.S. Pat. Nos. 5,826,338 & 6,070,638, incorporated herein by reference, could be modified using the materials disclosed herein to add ballistic protection to such blinds. Automatic deployment functions, as also described herein, could also be provided.

FIG. 8 shows an example of ballistic blinds provided between panes of glass, including slats 520 connected by center post 530 provided between a first pane 501 and a second pane 505 of glass, with a bottom 540 and a valence 510 which may store the blinds in a stowed position and main contain a mechanism to automatically drop the blinds upon detection of a ballistic event. Alternatively, the blinds may be permanently deployed but the slats rotated automatically or manually.

In particular, vertical blinds (or shades) can be used to provide bullet-proof protection, as described herein. Such blinds, although they may use hanging panels, can still provide ballistic projective protection by absorbing energy from a bullet or other projectile. Such a device may be comprised of a plurality of panels made of a ballistic material. Acceptable materials may include a high-density polymer (e.g., polyethylene, Tensylon), ceramic, metal (e.g., steel, titanium, and alloys thereof), aramid fiber (e.g., Kevlar), polycarbonate (e.g., Lexan), fiberglass (ArmorCore, see www.armorcore.com), carbon fibers, and other carbon structures, boron treated cloth, etc. and combinations thereof. Ballistic cloths can be used for such panels, such as by laminating such cloths, with or without other materials.

The blinds can be made with slats in more than one thickness. For example, two different thicknesses including ¼ inch or ½ inch thick slats may be provided. The blinds might have slats with a width of 3 inches, among other widths, as desired. The blinds can overlap (e.g., when closed) more for additional support and protection, and may include structure to enhance structural strength. Different types of cord for the panels to hang from, including exotic fibers such as boron and composite fiber, can be utilized. The blinds could fasten at the bottom or sides for additional strength and stability.

As examples, slats made from ArmorCore can be provided of dimensions 2"×36"×0.35" (weight=1.9 lbs./slat) Slats made from Tensylon can be provided of dimensions 2"×36"×0.23" (Total weight=0.6 lbs./slat).

Shades can be provided that are of a uniform material that don't use slats, but instead use one or more uniform layers of ballistic material, which may or may not be laminated, and may even be formed into panels or slats. Such shades can drop automatically, as described herein for the blinds. The shades may be opaque (blackout shades), or somewhat transparent (translucent) or totally transparent, or otherwise have small or large gaps to let light through, as desired. Multiple layers of material can be used in the shades, and the shades may be used in combination with the blinds to add extra protection. For example, the shade may automatically deploy (drop) when a ballistic event is detected, while blinds may automatically close (such as by rotating the slats).

FIG. 9 shows an example anti-ballistic window blind 600 that is automatically deployable. The blind has a valance 620 for housing any necessary gearing or other transmission mechanisms to allow the motor 630 to deploy and retract the blind 610. The valance 620 may be decorative in nature to be pleasing aesthetically, or covered in a decorative cloth or covering. Controller 640 may be wirelessly capable to communicate with an external control unit 690, or a home defense system (such as an anti-burglar system) by wire or wirelessly. A panic button 642 might also be provided to quickly deploy the blind. The individual slats 611 are comprised of material to provide anti-ballistic protection, as described in more detail above, and may have decorative layers as well. Vibrator 650 may be provided to apply vibration to the blinds to hamper audio detection systems.

A weight bar 615 can be used to weigh the blind 610 to aid in deployment, if desired. If desired, this weight 615 can be made of a magnetic material to be held in place by a magnet or electromagnet 617 provided on a window sill or floor or wall, such that the electromagnet is activated when a security situation is detected or otherwise triggered to better secure the blind 610 in place and improve its anti-ballistic performance. For power outages, the electromagnet may be battery powered, and only activated during as security event. Alternatively, a mechanical or electrical latch could be used for this purpose.

Alternatively, rather than a motor, the drive system 630 may utilize electromagnets or solenoids or pneumatic or hydraulic devices to retract and/or release the blind. For example, electromagnets may be used to hold the blind in a retracted position, for deployment during a security event by powering down the electromagnet when deactivated either by automated or manual means (as described herein), or by power outage, in which case the blinds, which can be weighted, can automatically deploy.

FIG. 9A shows a side view of an interlocking blind system where the slats 690 have grooves 694 and matching tongues 692 that allow adjacent slats to interlock with each other to add additional strength to the overall blind. Alternative structures could be used for similar purposes, such as tabs and slots, or curved edges, or even electromagnets.

FIG. 4 shows a similar deployable blind 610 that might be deployed in a vehicle, such as a truck, automobile, train, aircraft, or other vehicle to protect vehicle access points like windows.

In contrast, a fixed barrier might be deployed within the door body panels, or other hollow body locations, that is permanently deployed within the door and attached to the door frame to add anti-ballistic properties to the body of the door. Such a barrier might have the upper portion attached to the door frame but hang freely within the door panels within free space in the door to provide the benefits of such a structure as described herein. The barrier would then absorb the energy of a projectile as described above. Such a barrier could be installed during manufacture of the vehicle, or might be provided as an after-market installation to add anti-ballistic properties to existing vehicles. The window blinds might also be added at the factory or as an after-market add-on.

For example, the flexible barrier in, say, a 3.5 inch door cavity takes up about ¼ inch to 1 inch of the overall space. The shock wave that goes across the material from the projectile dissipates the energy through and across the whole piece of material rather than just a small area directly around the projectile when the material is affixed to the strike face of the door. The shock wave dissipates the energy more efficiently through the material than would a fixed barrier.

Other options for use in vehicle door panels and other hollow bodies include inflatable bags that can fill with an anti-ballistic gel, sand, balls or other material to provide anti-ballistic protection. Airbag type devices might also be provided that deploy outside of the body panels to protect individuals inside the vehicle, where such airbags might be comprised of anti-ballistic inflatable sheets as discussed herein or filled with anti-ballistic material such as a gel. Such systems may be automatically or manually deployed, or permanently deployed, all of which is discussed herein and in the parent applications for various barrier embodiments.

Figure 11:
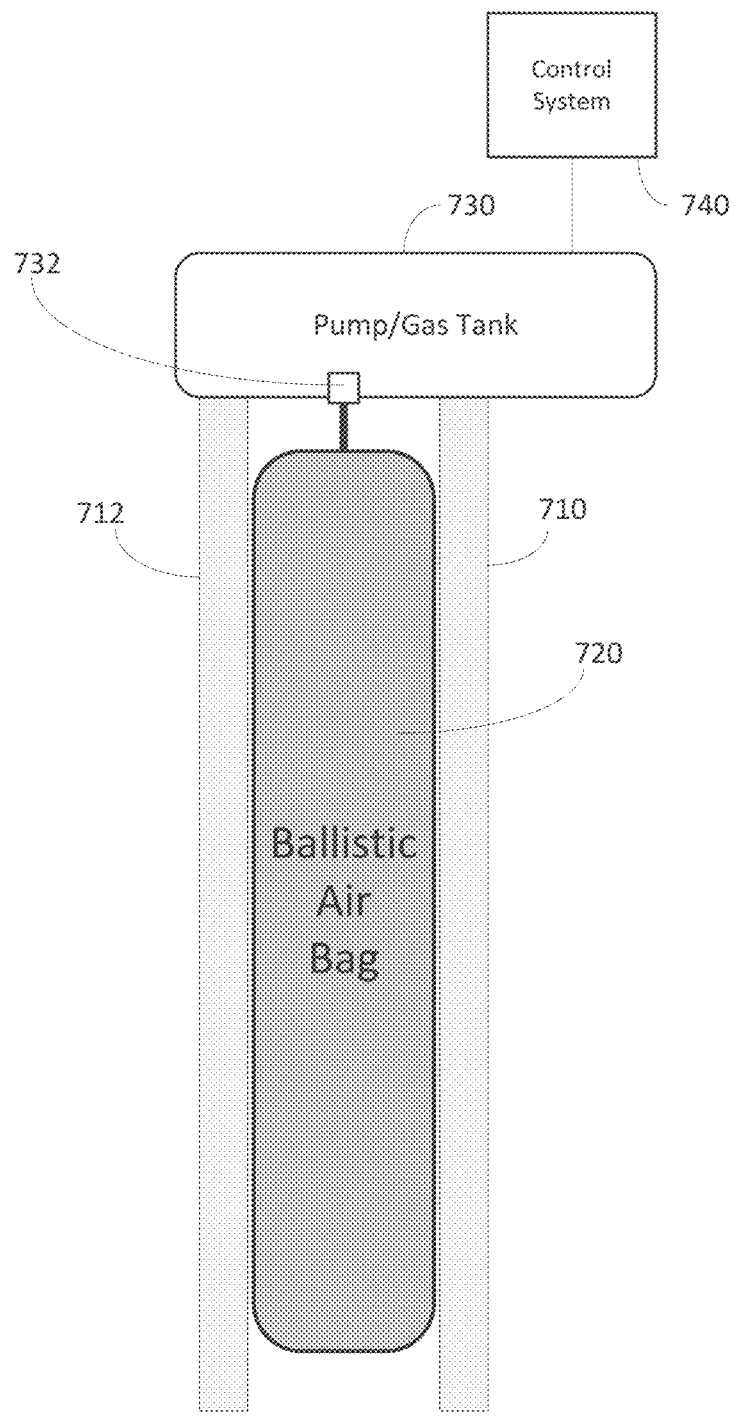
FIG. 11 illustrates an example embodiment of a deployable ballistic air bag system'

FIG. 11 shows a protection system 700 that uses a deployable airbag 720 that is comprised of anti-ballistic materials, such as described herein. This airbag 720 can be provided between panes of glass 710, 712, for example, and can be inflated using a pump or air tank 730 with a valve 732 for sealing the air bag. When retracted, the deflated bag may reside near the top of the structure, perhaps hidden from view. A control system 740 can be provided, such as to wirelessly connect to a home defense control system or a remote control, for example. In some cases, the air bag may not be retracted, but may be permanently deployed. Note that the bag might be filled with an anti-ballistic gel (as described hereinbelow), rather than air, to add additional protection.

Figure 12:
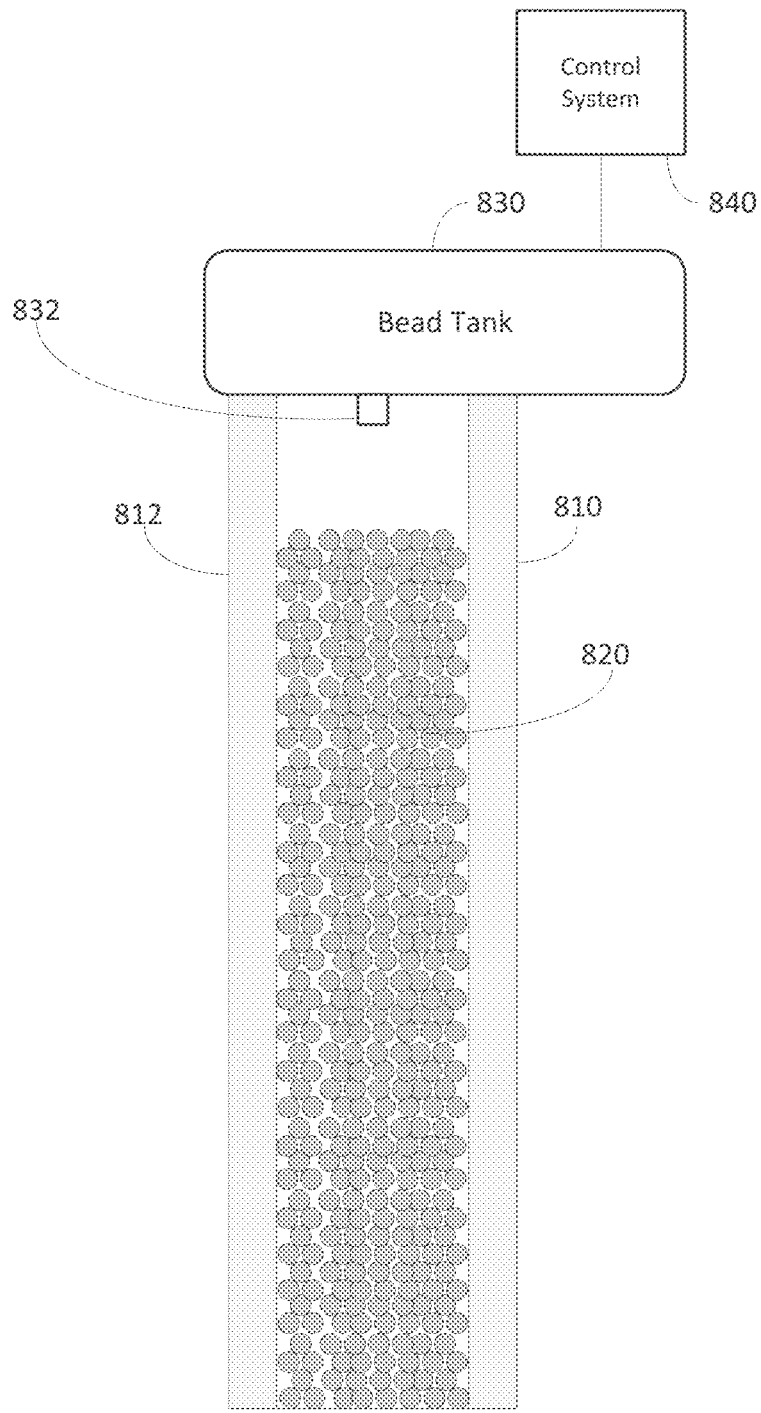
FIG. 12 illustrates an example embodiment of an anti-ballistic bead system.

FIG. 12 shows a protection system 800 that uses deployable beads 820 that are comprised of anti-ballistic materials, such as described herein. This system can be provided to deploy bead between panes of glass 810, 812, for example, and can be inflated using a bead storage tank 830 with a valve 832 for releasing the beads or pumping them in place. A control system 840 can be provided, such as to wirelessly connect to a home defense control system or a remote control, for example.

Note that for some applications, the beads may be deployed permanently between the panes of glass, or anywhere else that ballistic protection is desired, including in hard-to-reach areas such as in doors or walls. The beads may be small and light enough to be deployed by using a pump or fan to blow the beads in place, and/or to remove them.

The beads can be comprised of any of the materials described herein, including ceramic materials or carbon fiber materials which may be particularly applicable for this purpose.

Figure 10:
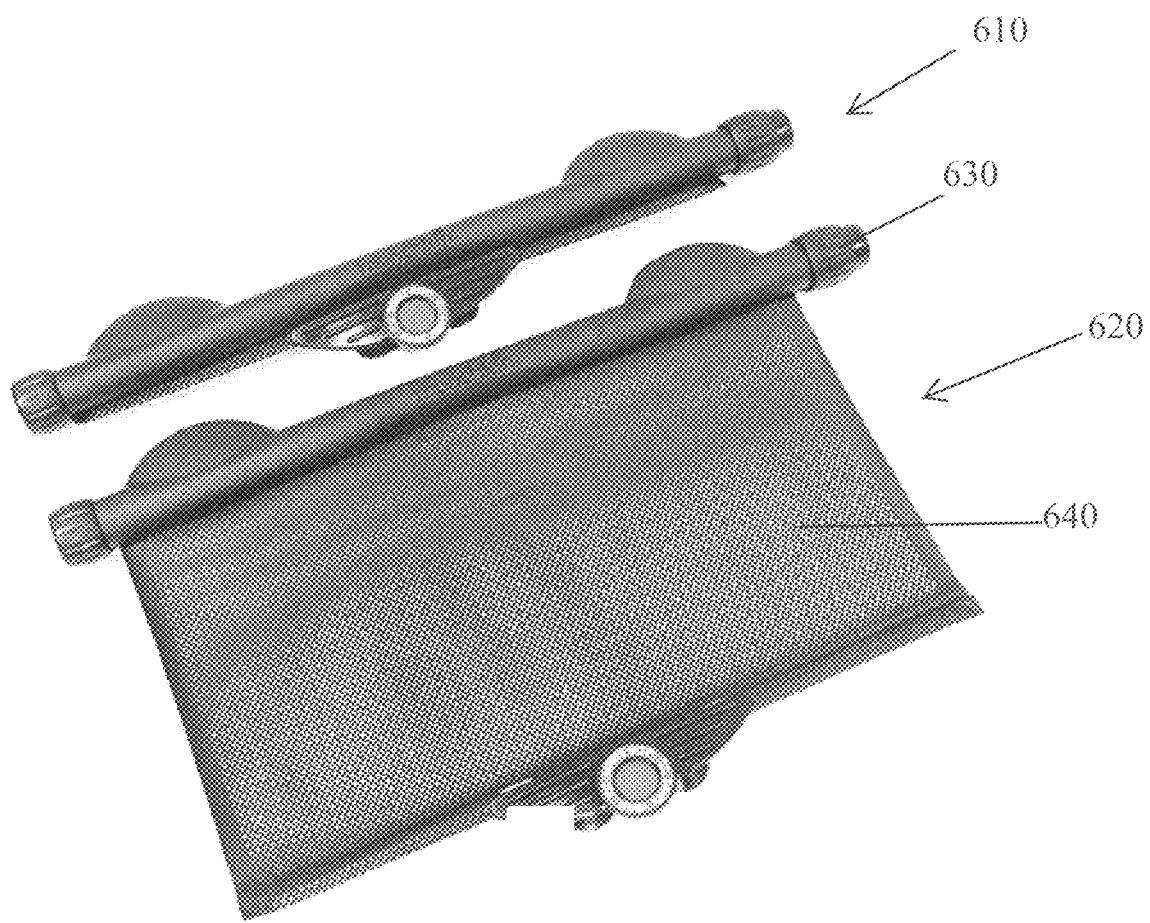
FIG. 10 illustrates an example embodiment of a vehicle shade system for a vehicle.

The blinds or shades can be utilized in automotive applications, such as currently blinds that are provided in some vehicles, such as in limousines or luxury vehicles, for example. FIG. 10 shows an example style of blind that can be used in an automobile, which could be constructed of ballistic material. The blind is shown in retracted mode 610, and partially deployed mode 620. The bullet proof vehicle blinds can be provided on the inside of glass, mounted using mounting hardware valance 630 with bullet proof material sheet 640, or the blind could reside between layers of safety glass (e.g., in automobiles) or each layer of glass can have a layer of safety film on them such as, for example, 4-10 mil.

Figure 13:
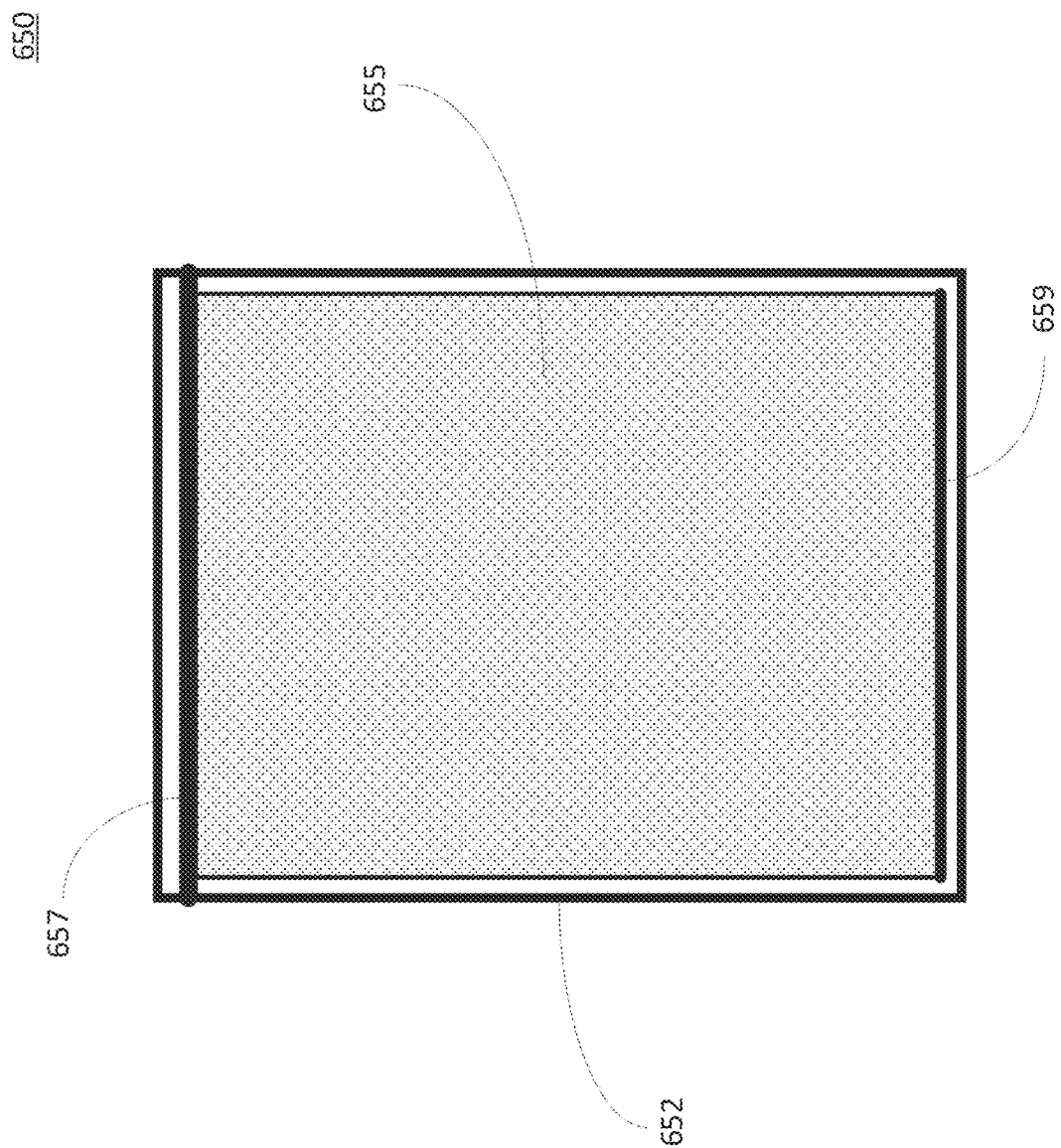
FIG. 13 illustrates an example installation of a vehicle shade system for an automobile.

FIG. 13 shows an example blind 650 that could be used in a vehicle, such as an automobile or even an aircraft. The window 652 is fitted with an antiballistic blind 655 that is deployed from valence 657 that is mounted in the window, or might be mounted in a roof of the vehicle. A weight bar 659 might be provided to ensure that the blind properly deploys, such as by gravity. Such blinds would more likely not be venetian style, but instead be solid sheets of material, as discussed herein, that drop manually or automatically upon detection of an emergency condition.

Note that anti-ballistic sheets might be used to provide protection in door and other body panels or other cavities. Alternatively or additionally, air bags constructed of anti-ballistic material (see discussion below regarding FIG. 11 for some examples), could be utilized. For example, the airbags of a vehicle might be constructed of anti-ballistic laminates as disclosed herein, or filled with anti-ballistic fibers or gels or other materials. Alternatively, additional anti-ballistic air bags could be provided in the vehicles.

The blind could be deployed in a manner similar to that discussed above with respect to other blinds, and these vehicle blinds might also have adjustable blades/louvers, which can have a groove that runs the length of the louver. This groove or notch can allow the louvers to interlock for additional strength. With either the home/commercial application or the automotive application the blinds can be electronic and close automatically when gunfire is sensed. The front windshield one could close partially or slowly according to the speed of the vehicle. The blinds could have fasteners that allow them to interlock. The blinds could also engage with the window sill for added strength. There could also be 2 or more layers of blinds depending on the threat. This would also allow light in but keep bullets out.

Such blinds may be deployed in school buses, public transportation (busses, trains, trolleys, taxis, even planes, for example) to protect children or other members of the public in battlefield areas or in dangerous cities or sections of cities, for example. Schools and other public buildings could be provided with such blinds, for example.

The blinds could be used to retrofit existing vehicle blinds that do not have bullet-proof or other ballistic features, or they could be installed as original equipment or as aftermarket add-ons.

The vehicle blinds could be configured to vibrate at a random or constant rate, as described above, to prevent an interferometers or vibration sensing listening devices from working through the blinds, avoiding eavesdropping or other spying activities. Vibration can be applied to the blinds through use of motors or piezo devices in a manner known in the art to create vibrations. Such blinds may be ideal for board rooms or military planning rooms to avoid spying operations.

Note that blinds that are constructed of ceramic or composite ballistic material can be much lighter and cheaper to build than blinds that use metallic materials, such as steel, for example, and they could prove flexible and more deployable and retractable.

Blinds using fabric and/or panels held together by fabric can be utilized. Also having blinds in a horizontal or vertical position. Closing and opening from all possible sides can be provided, e.g., from the top or bottom or left or right. Also a combination of these approaches can be used. Blinds could close from both sides. Or close from the top and bottom where each blind half covers half of a particular window.

Roll down fabric blinds using ballistic materials that come down from the top, such as that can be quickly deployed can prove useful. Also panels that fold down from the top can be utilized.

Ballistic resistant panels can be provided with the ballistic material provided on back of an ornamental design (e.g., wooden slats), or between ornamental designs, so that the blinds provide traditional ornamental aesthetics. The ballistic materials may be woven into a layered cloth that can be attached, glued, or otherwise combined with the ornamental panels to achieve the desired effect. A string or rope made of the ballistic material can be used to replace the string/rope that may be utilized in existing blind applications.

Figure 7:
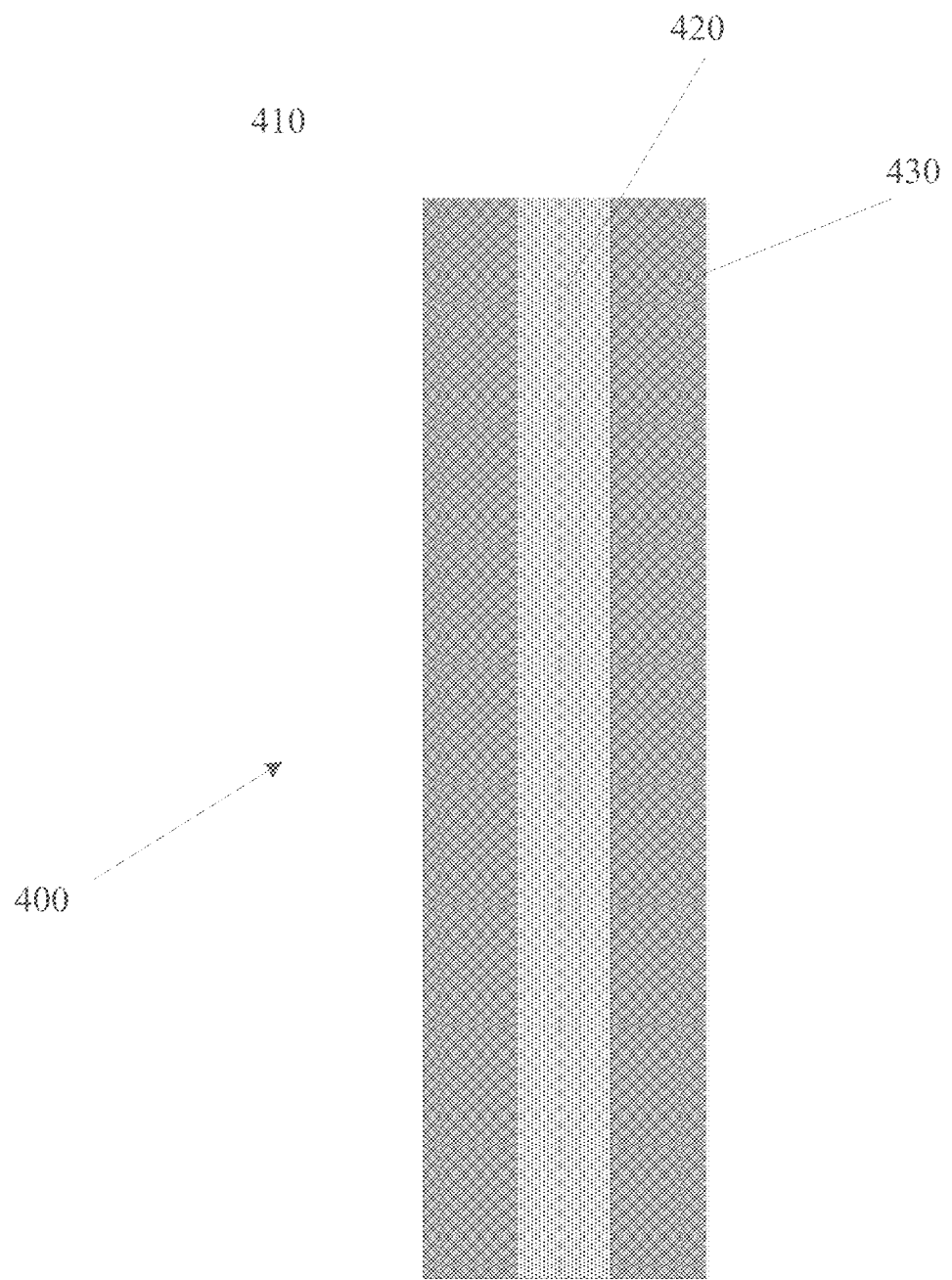
FIG. 7 illustrates an example laminated structure for blind slats that provide both decorative and anti-ballistic features.

For example, FIG. 7 shows a side view of a laminated slat 400 having ballistic layer 420 sandwiched between decorative layers 410 and 430. As an example, layers 410, 430 could be a single layer of fabric surrounding a ballistic panel as layer 420. Or ballistic layer 420 might comprise a ballistic fabric, making the entire slat of layers of fabric and/or sheets of material. Hence, part of the blind, such as louvers/slats, can be made in this laminated manner to provide both decorative and anti-ballistic features. The layers could be glued together, or bonded in some other manner, such as by heating them to weld them together or stitching them together using a strong thread, as described for the embodiment shown in FIG. 7A, discussed below. A lamination machine that binds the layers using heat can be used.

Figure 7A:
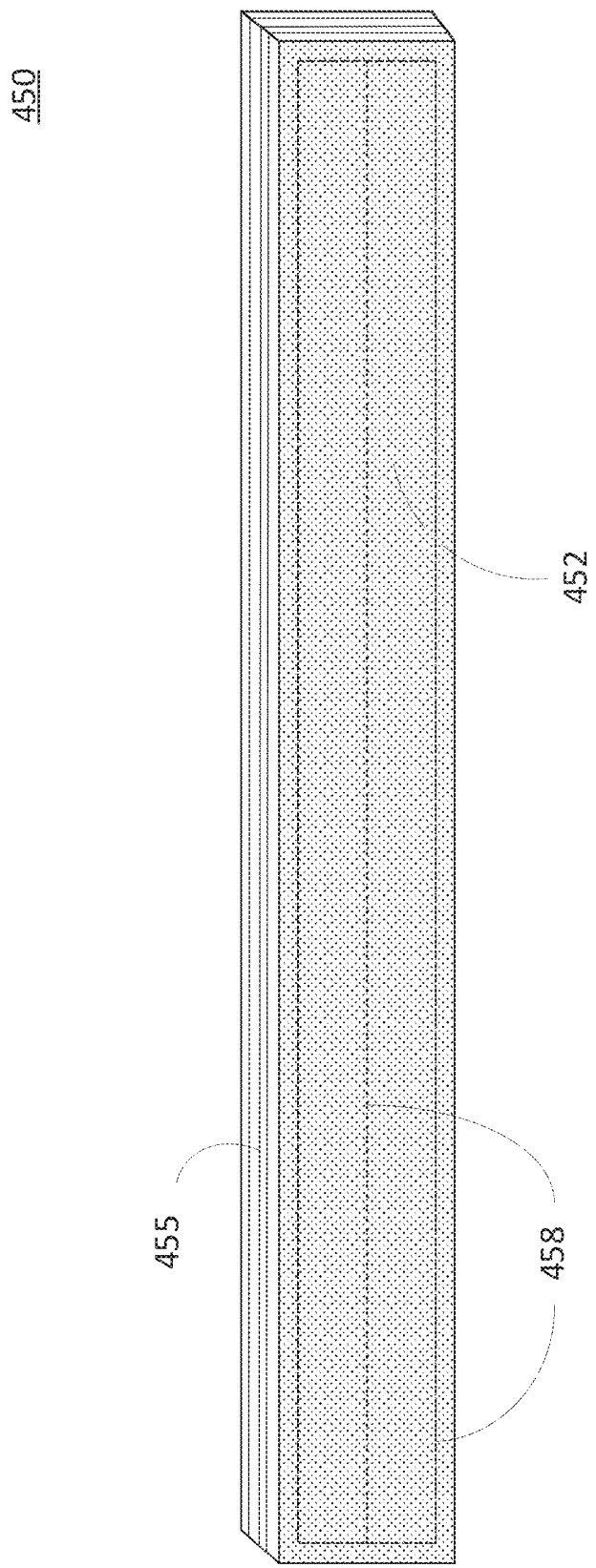
FIG. 7A illustrates another example laminated structure for blinds that provide a plurality of layers stitched together.

FIG. 7A shows an example blind comprised of an anti-ballistic laminate 450 having a plurality of layers of flexible, anti-ballistic material 455 and a decorative top layer 452 that are stitched together using stitching 458. An embodiment may use any number of layers of anti-ballistic material, which may be a woven cloth material or a thin sheet. For example, such a blind might use two, or more than two such layers. In a preferred embodiment, 18 layers of level 3A bullet proof material, such as an antiballistic cloth material or thin sheets of material as discussed above can be stacked into a laminate that can be glued, heat welded, or stitched using a thread, such as nylon, polyester, Kevlar or Dyneema® threads, to secure the layers together. The top (and in some cases bottom as well) decorative layer 452 can be comprised of a decorative cloth or sheet. A binding material or strip can be put around the outer edge of the sheets or slats for decorative purposes or for physical support and further binding. For large sheets of materials, stitching will be provided at periodic intervals (e.g., 0.75 inch spacing).

For example, 18 plies of woven Kevlar fabric such as a 600d Kevlar KM2 Plus, 24×24 square yarns per inch, plain weave construction, polyester stitching yarn, 75 denier textured yarn with a stitch pattern from a linear chain stitch (machine direction), 3.5 gage spacing or 0.75 inch spacing.

Figure 7B:
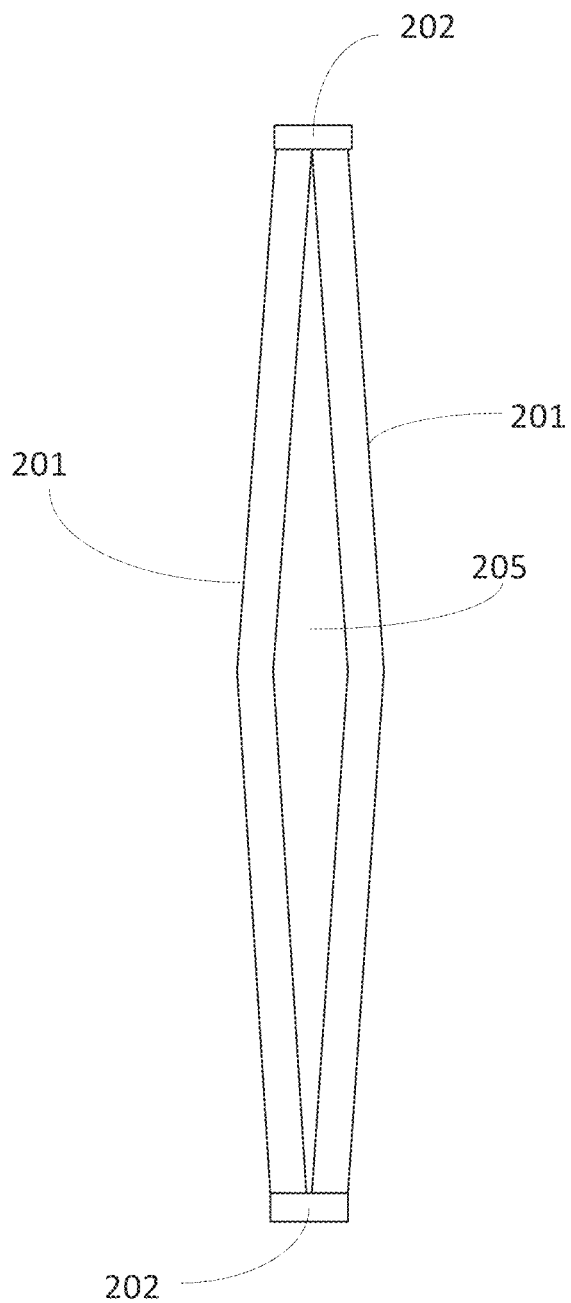
FIG. 7B illustrates another example laminated structure for blinds that provide a plurality of layers having a hollow interior.

Sheets of material of the blinds, or individual slats, may have the individual fabric sheets bound by using a glue or substance around a perimeter of the sheets or a pair of edges to hold the sheets together, but let the layers remain unbound in an interior portion. FIG. 7B shows a side view of an example two-layer laminate 200 with first and second fabric layer 201 having only upper and lower edges 202 bound with an edging material (such as stitching, bonding, edging, etc.) leaving an inner gap 205 formed from the loose material. Of course, any number of layers can be used in the laminate rather than just 2. This approach could be designed to self-destruct in order to better absorb the energy of a projectile.

The laminated material of FIG. 7 or 7A or 7B can be formed into slats to form venetian style blinds, or alternatively into sheets to form solid blinds that can be used in homes or vehicles as discussed herein.

Alternatively, tensylon slats can be used for the venetian style blinds. As an alternative, a thin layer of steel as a strike face can be provided on the slats to improve the anti-ballistic properties. Tensylon slats, with or without the steel surface layer, can slide in pockets on the kevlar fabric blinds to add further protection, such as in solid sheets that are rolled up when retracted and unrolled when deployed, as described hereinabove. Such blinds re flexible and lightweight, and could be designed to level 4 protection to stop rifle rounds.

For vertical blinds such as shown in FIG. 1A, the blind panels from a support structure, and they can be pulled to a side horizontally to open the blinds. The slats may also be rotated to open the blind to light, or to block the light or provide privacy, such as at night. Such a system may be automatically deployed (i.e., closed) by both extending the blind, and/or rotating the slats closed, depending on the current state of deployment, to provide ballistic protection when a threatening event is detected, as discussed above.

Ballistic blinds might also be arranged in a manner similar to drapes, where ballistic fabric is used to form the bullet proof drapes. In this case, the drapes can be deployed in a manner similar to fabric drapes. Vertical slats can be used in such approaches as well, where the slats fold together when the "drapes" are withdrawn (opened), and unfold when the "drapes" are deployed (closed).

Note that blinds could also be installed in the interior of rooms or against walls with the structures being installed at the ceiling or above a drop ceiling, so that the blinds can be dropped when needed for protecting a wall or room. Automatic deployment can occur as discussed above for window blinds. It has been found that free-hanging blinds can actually perform better than blinds that are secured at the bottom or sides, likely due to better energy dissipation properties when the blind is permitted to move upon impact with a bullet or shrapnel. Hence, blinds without being secured at the bottom and sides are of particular interest and make up some preferred embodiments, although a weight may be used on the bottom edge of the blinds to aid in deployment.

An alternative blind design could utilize thin layers of glass with graphene centers or Lexan between two layers of glass that may be transparent or translucent sheets or slats. A transparent or translucent anti-ballistic gel might also be used, such as shear thickening fluids that are transparent to fill the gaps between window panes or layers of glass. Some of these materials harden upon impact and might be comprised of non-Newtonian fluids that that thicken in response to force (such as mixtures of cornstarch and water do). Examples of such materials have been disclosed recently but their composition are trade secrets. See www.sciencealert.com/liquid-armour-is-now-a-thing-and-it-stops-bullets-better-than-kevlar and www.telegraph.co.uk/news/uknews/defence/4862103/Military-to-use-new-gel-that-stops-bullets.html for examples.

It is desirable that the blinds meet NIJ level IIIA standards or above. Large sheets of material can be formed which are then water jet cut to 2.5"×36" strips of material out of the larger sheets for slats, for example.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

The invention claimed is:

1. A method of protecting an interior space of a building from a ballistic projectile using a flexible ballistic barrier, said method comprising the steps of:
   providing the ballistic barrier comprised of a plurality of sheets of lightweight anti-ballistic woven material laminated together into a flexible laminate, wherein said ballistic barrier is configured to stow into a rolled position when retracted and drop into an extended barrier position when deployed, and wherein said ballistic barrier engages with a mounting structure for receiving said ballistic barrier in the rolled position;
   installing said ballistic barrier in an interior of said building using said mounting structure mounted to a part of the building;
   after installing said ballistic barrier, retracting the installed ballistic barrier by rolling said ballistic barrier into the rolled position to expose at least a portion of said interior space; and
   in response to a ballistic threat, deploying the installed ballistic barrier into the extended position protect the portion of the interior space from the ballistic projectile.

2. The method of claim 1, further comprising the step of connecting a bottom end of the ballistic barrier to a structure of the building when the ballistic barrier is in the deployed position.

3. The method of claim 1, further comprising the step of connecting a side of the ballistic barrier to a structure of the building when the ballistic barrier is in the deployed position.

4. The method of claim 1, wherein the plurality of sheets of lightweight anti-ballistic woven material are laminated together into the flexible laminate by sewing the plurality of sheets together.

5. The method of claim 1, wherein the plurality of sheets of lightweight anti-ballistic woven material are laminated together into the flexible laminate by using an adhesive to secure the plurality of sheets together.

6. The method of claim 1, further comprising the step of securing an outer decorative layer to the laminate as part of the ballistic barrier.

7. The method of claim 1, wherein a side and/or a bottom end of the ballistic barrier is configured to engage a securing structure mounted to the building when the ballistic barrier is deployed to stabilize the ballistic barrier, wherein the deployed ballistic barrier is configured to flex and/or move to absorb kinetic energy from the ballistic projectile while engaging the securing structure.

8. The method of claim 1, further comprising the steps of:
providing a structure for automatically deploying said ballistic barrier;
automatically monitoring an environment of the building for a threatening situation; and
automatically deploying said ballistic barrier in response to said threatening situation.

9. The method of claim 1, wherein at least one sheet of said sheets of lightweight anti-ballistic woven material is comprised of at least one of an anti-ballistic material including a poly-para-phenylene terephthalamide, a transparent polycarbonate, a polymethyl methacrylate, an ultrahigh molecular weight polyethylene, and/or a boron treated cloth.

10. The method of claim 1, wherein the step of installing said ballistic barrier includes the step of permanently installing the ballistic barrier in the building by fixedly mounting said mounting structure to a window frame, wall, ceiling, or doorframe for long-term permanent installation and use.

11. The method of claim 1, wherein said ballistic barrier operates as a window blind, and wherein the step of installing said ballistic barrier includes the step of installing the ballistic barrier in the building by fixedly mounting said mounting structure at a window frame as a window blind integrated into the building.

12. The method of claim 1, wherein the step of installing said ballistic barrier includes the step of installing the ballistic barrier in the building by mounting said mounting structure in a hallway.

13. The method of claim 1, wherein the step of installing said ballistic barrier includes the step of installing the ballistic barrier in a doorway by mounting said mounting structure at the doorway.

14. The method of claim 1, wherein the ballistic projectile is a bullet fired from a gun.

15. A method of protecting an interior space of a building from a ballistic projectile using a flexible ballistic barrier, said method comprising the steps of:
providing the ballistic barrier comprised of a plurality of sheets of lightweight anti-ballistic woven material laminated together into a flat, flexible laminate, wherein said ballistic barrier is configured to stow into a compact retracted position when retracted and extend into an extended barrier position when deployed, and wherein said ballistic barrier engages with a mounting structure for receiving said ballistic barrier in the rolled position;
installing said ballistic barrier fixedly in the building to a part of the building by permanently mounting said mounting structure to a window frame, wall, ceiling, or doorframe for fixed installation;
installing a securing structure to another part of said building for engaging a side and/or a bottom end of said ballistic barrier to the other part of the building when the ballistic barrier is deployed;
after said installing, retracting the installed ballistic barrier by rolling said ballistic barrier into the rolled position exposing at least a portion of said interior space; and
in response to a ballistic threat, deploying the installed ballistic barrier into the extended position with the ballistic barrier engaging said securing structure, said ballistic barrier protecting the at least a portion of the interior space from the ballistic projectile.

16. The method of claim 15, wherein the plurality of sheets of lightweight anti-ballistic woven material are laminated together into the laminate by sewing the plurality of sheets together.

17. The method of claim 15, wherein the plurality of sheets of lightweight anti-ballistic woven material are laminated together into the laminate by using an adhesive to secure the plurality of sheets together.

18. The method of claim 15, further comprising the step of securing an outer decorative layer to the plurality of sheets of lightweight anti-ballistic woven material as part of the laminate.

19. The method of claim 15, wherein, when in said deployed position, said ballistic barrier is configured to flex and/or move to absorb kinetic energy from the projectile while being engaged to the securing structure.

20. The method of claim 15, further comprising the steps of:
providing a structure for automatically deploying said ballistic barrier;
automatically monitoring an environment of the building for a threatening situation; and
automatically deploying said ballistic barrier in response to said threatening situation.

21. The method of claim 15, wherein at least one sheet of said sheets of lightweight anti-ballistic woven material is comprised of an anti-ballistic material including one or more of a poly-para-phenylene terephthalamide, a transparent polycarbonate, a polymethyl methacrylate, an ultrahigh molecular weight polyethylene, and/or a boron treated cloth.

22. The method of claim 15, wherein said ballistic barrier operates as a window blind, and wherein the step of installing said ballistic barrier includes the step of permanently installing the ballistic barrier in the building by mounting said mounting structure at a window frame as a window blind in a fixed location.

23. The method of claim 15, wherein the step of installing said ballistic barrier includes the step of permanently installing the ballistic barrier in the building by mounting said mounting structure in a hallway.

24. The method of claim 15, wherein the step of installing said ballistic barrier includes the step of permanently installing the ballistic barrier in the building by mounting said mounting structure at a doorway.

25. The method of claim 15, wherein the ballistic projectile is a bullet fired from a gun.

26. A method of protecting an interior space of a building from a bullet fired from a gun using a window blind including a ballistic barrier, said method comprising the steps of:
providing the window blind including the ballistic barrier comprised of a plurality of sheets of lightweight antiballistic woven cloth laminated together into a flexible laminate using an adhesive and/or by sewing the layers together, said laminate also including an outer layer different than the plurality of sheets, wherein said ballistic barrier is configured to stow into a rolled position when retracted and drop into an extended barrier position when deployed, and wherein said window blind includes a mounting structure for receiving said ballistic barrier in the rolled position;
installing said window blind permanently at a window frame by fixedly mounting said mounting structure to the window frame, a wall, a ceiling, and/or another structure of the building for a durable, fixed installation;
installing a securing structure to said building for engaging a side and/or a bottom end of said ballistic barrier when in the deployed position;

retracting the installed ballistic barrier by rolling said laminate into the rolled position to expose at least a portion of said window to the interior space; and in response to a ballistic threat, deploying the installed ballistic barrier into a deployed position that engages said securing structure, said ballistic barrier covering a substantial portion of the window when deployed, wherein, when in said deployed position, said ballistic barrier is configured to flex and/or move to absorb kinetic energy from the bullet while engaging the securing structure to prevent said bullet from entering said interior space.

27. The method of claim 26, wherein at least one sheet of said sheets of lightweight anti-ballistic woven material is comprised of an anti-ballistic material including one or more of a poly-para-phenylene terephthalamide, a transparent polycarbonate, a polymethyl methacrylate, an ultrahigh molecular weight polyethylene, and/or a boron treated cloth.

28. The method of claim 26, further comprising the steps of:

providing a structure for automatically deploying said ballistic barrier;

automatically monitoring an environment of the building for a threatening situation; and automatically deploying said ballistic barrier in response to said threatening situation.

29. The method of claim 26, wherein said monitoring the environment of the building for a threatening situation includes automatically detecting an explosion and/or a gunshot and/or an intruder.

* * * * *